US012695737B2

(12) United States Patent
Jhaveri et al.

(10) Patent No.: US 12,695,737 B2
(45) Date of Patent: Jul. 28, 2026

(54) TECHNIQUES FOR SECURE HOST CONNECTIVITY IN DISASTER RECOVERY SCENARIOS

(71) Applicant: Rubrik, Inc., Palo Alto, CA (US)

(72) Inventors: Anish Jhaveri, Sunnyvale, CA (US); Anshul Mohan Gupta, San Jose, CA (US); Chak Fai Yuen, Bangalore (IN); Hao Wu, Mountain View, CA (US); Sandeep Kanyal, Bangalore (IN); Seungyeop Han, San Jose, CA (US); Shivam Rajpal, Saharanpur (IN); Sriharshitha Velivelli, Hyderabad (IN)

(73) Assignee: Rubrik, Inc., Palo Alto, CA (US)

( * ) Notice: Subject to any disclaimer, the term of this patent is extended or adjusted under 35 U.S.C. 154(b) by 501 days.

(21) Appl. No.: 17/871,308

(22) Filed: Jul. 22, 2022

(65) Prior Publication Data

US 2024/0031353 A1     Jan. 25, 2024

(51) Int. Cl.
H04L 9/40 (2022.01)
H04L 9/32 (2006.01)

(52) U.S. Cl.
CPC ........ H04L 63/0823 (2013.01); H04L 9/3265 (2013.01); H04L 9/3268 (2013.01)

(58) Field of Classification Search
CPC . H04L 63/0823; H04L 9/3265; H04L 9/3268; H04L 9/3247
See application file for complete search history.

(56) References Cited

U.S. PATENT DOCUMENTS

| | | | | |
|---|---|---|---|---|
| 5,787,172 A | * | 7/1998 | Arnold ................. | H04L 9/3263 |
| | | | | 713/157 |
| 9,787,477 B1 | * | 10/2017 | Singal ................. | H04L 9/3265 |
| 10,728,044 B1 | * | 7/2020 | Melo ..................... | H04L 9/0825 |
| 10,839,382 B2 | * | 11/2020 | Holden ................. | H04L 63/20 |
| 11,079,968 B1 | * | 8/2021 | Patel .................. | G06F 11/2025 |
| 2003/0188156 A1 | * | 10/2003 | Yasala ................. | H04L 9/3265 |
| | | | | 713/156 |
| 2006/0291664 A1 | * | 12/2006 | Suarez ................. | H04L 9/3263 |
| | | | | 380/286 |
| 2007/0180302 A1 | * | 8/2007 | Allen ................. | G06F 11/2071 |
| | | | | 714/E11.08 |
| 2007/0220319 A1 | * | 9/2007 | Desai ................. | G06F 11/1464 |
| | | | | 714/13 |

(Continued)

*Primary Examiner* — Ramy M Osman
(74) *Attorney, Agent, or Firm* — Holland & Hart LLP

(57) ABSTRACT

A method for establishing secure connectivity is described. The method may include transmitting, to one or more host nodes of a data management system (DMS), an indication of a backup service configuration that includes a public key certificate associated with a first cluster of storage nodes in the DMS and a root certificate associated with a certificate authority. The method may further include establishing a primary connection between the first cluster and the host nodes using the public key certificate. The method may further include obtaining, by a second cluster of storage nodes in the DMS, a certificate chain signed by the certificate authority. The method may further include establishing a secondary connection between the second cluster and the host nodes in response to the first cluster becoming disconnected from the host nodes, where the secondary connection is established using the certificate chain.

18 Claims, 12 Drawing Sheets

(56)                    References Cited

U.S. PATENT DOCUMENTS

| | | | | |
|---|---|---|---|---|
| 2007/0223706 A1* | 9/2007 | Gantman | ............... | G06F 21/602 |
| | | | | 380/286 |
| 2010/0191973 A1* | 7/2010 | Huntzicker | ......... | H04W 12/069 |
| | | | | 713/176 |
| 2015/0372811 A1* | 12/2015 | Le Saint | ............... | H04L 63/068 |
| | | | | 705/76 |
| 2016/0028701 A1* | 1/2016 | Hua | .................... | H04L 63/0485 |
| | | | | 713/151 |
| 2018/0006827 A1* | 1/2018 | Naik | ..................... | H04L 9/3268 |
| 2021/0067347 A1* | 3/2021 | Yu | .......................... | H04L 9/3247 |
| 2021/0344486 A1* | 11/2021 | Madineni | ............. | H04L 9/0869 |
| 2022/0029989 A1* | 1/2022 | Mathur | ................. | G06F 21/606 |
| 2022/0109581 A1* | 4/2022 | Ledworowski | ....... | H04L 9/0894 |
| 2023/0353392 A1* | 11/2023 | Hockey | ................ | H04L 9/0891 |
| 2025/0227797 A1* | 7/2025 | Wu | ....................... | H04W 12/04 |

* cited by examiner

First Cluster
520-a

Host Nodes
525

Second
Cluster 520-b

505 — Backup Service
Configuration

530 — Transmit CSR

Establish Primary
Connection

510

535 — Obtain Signed
Certificate Chain

Exchange Encrypted
Messages

515

Connection Failure

540

Signed
Certificate Chain

545

550 — Validate
Certificate Chain

Establish Secondary
Connection

555

Exchange Encrypted
Messages

560

500

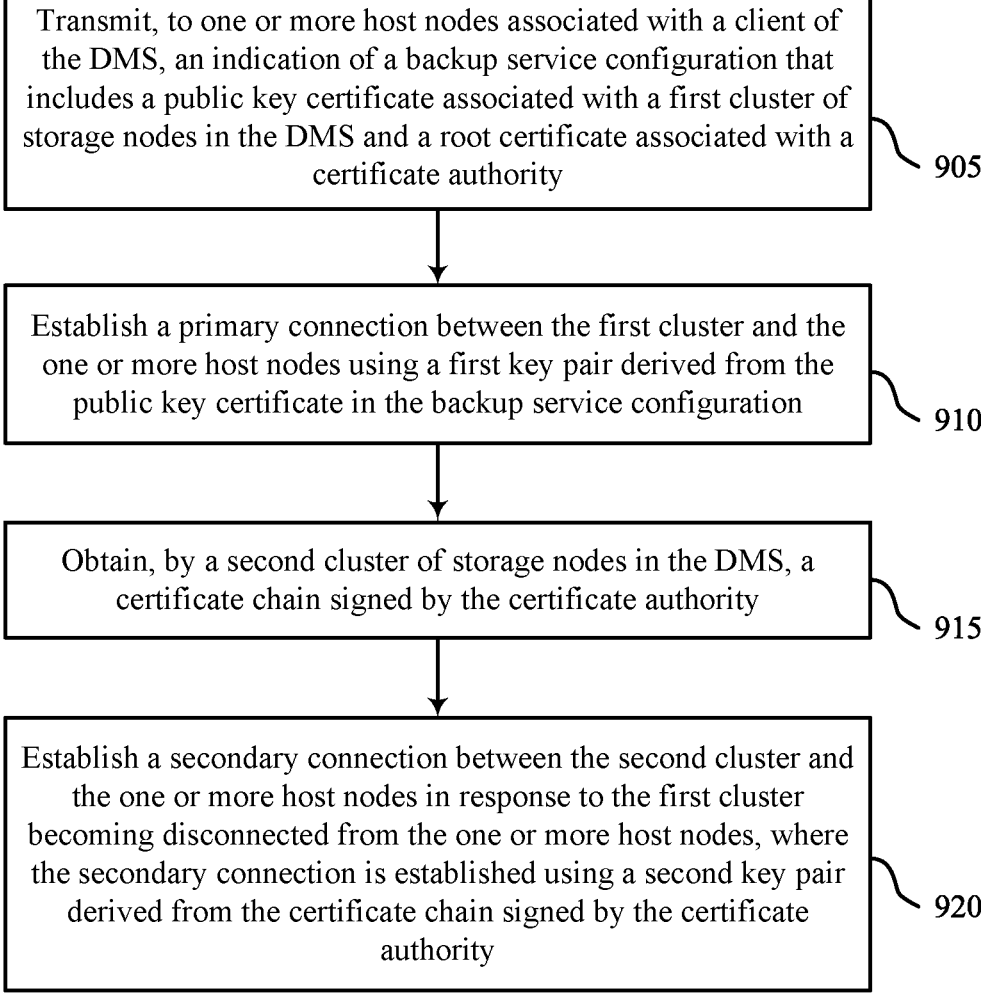

Transmit, to one or more host nodes associated with a client of the DMS, an indication of a backup service configuration that includes a public key certificate associated with a first cluster of storage nodes in the DMS and a root certificate associated with a certificate authority

905

Establish a primary connection between the first cluster and the one or more host nodes using a first key pair derived from the public key certificate in the backup service configuration

910

Obtain, by a second cluster of storage nodes in the DMS, a certificate chain signed by the certificate authority

915

Establish a secondary connection between the second cluster and the one or more host nodes in response to the first cluster becoming disconnected from the one or more host nodes, where the secondary connection is established using a second key pair derived from the certificate chain signed by the certificate authority

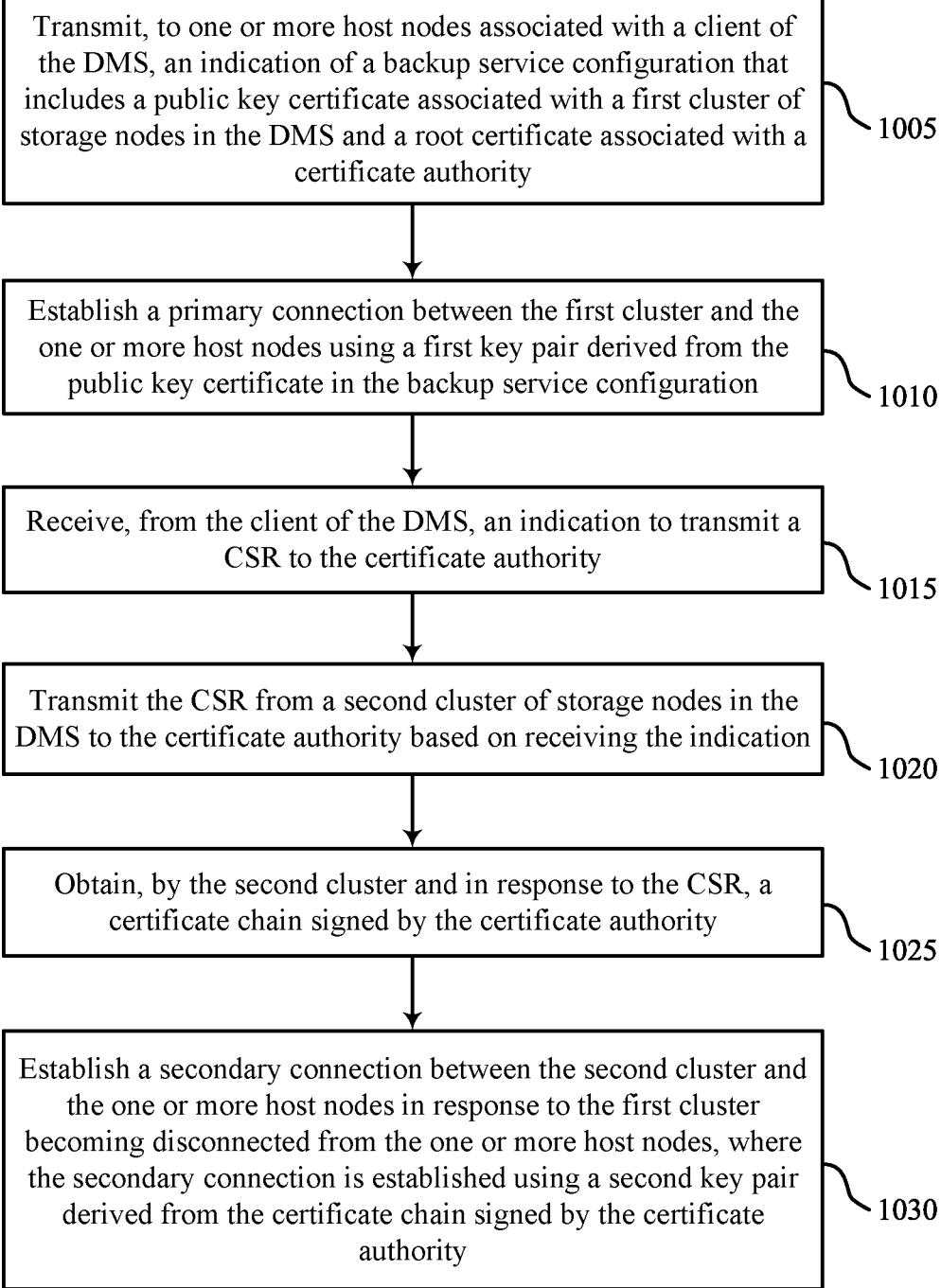

Transmit, to one or more host nodes associated with a client of the DMS, an indication of a backup service configuration that includes a public key certificate associated with a first cluster of storage nodes in the DMS and a root certificate associated with a certificate authority

1005

Establish a primary connection between the first cluster and the one or more host nodes using a first key pair derived from the public key certificate in the backup service configuration

1010

Receive, from the client of the DMS, an indication to transmit a CSR to the certificate authority

1015

Transmit the CSR from a second cluster of storage nodes in the DMS to the certificate authority based on receiving the indication

1020

Obtain, by the second cluster and in response to the CSR, a certificate chain signed by the certificate authority

1025

Establish a secondary connection between the second cluster and the one or more host nodes in response to the first cluster becoming disconnected from the one or more host nodes, where the secondary connection is established using a second key pair derived from the certificate chain signed by the certificate authority

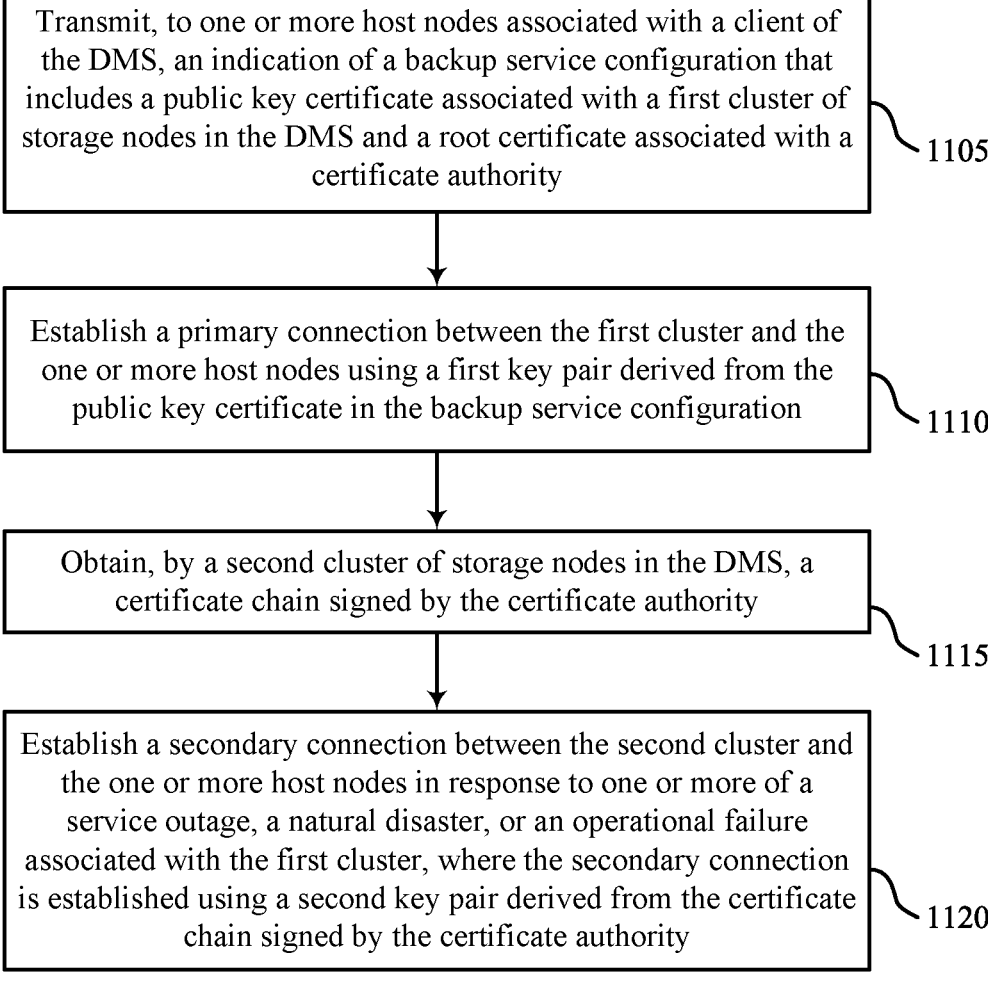

Transmit, to one or more host nodes associated with a client of the DMS, an indication of a backup service configuration that includes a public key certificate associated with a first cluster of storage nodes in the DMS and a root certificate associated with a certificate authority

1105

Establish a primary connection between the first cluster and the one or more host nodes using a first key pair derived from the public key certificate in the backup service configuration

1110

Obtain, by a second cluster of storage nodes in the DMS, a certificate chain signed by the certificate authority

1115

Establish a secondary connection between the second cluster and the one or more host nodes in response to one or more of a service outage, a natural disaster, or an operational failure associated with the first cluster, where the secondary connection is established using a second key pair derived from the certificate chain signed by the certificate authority

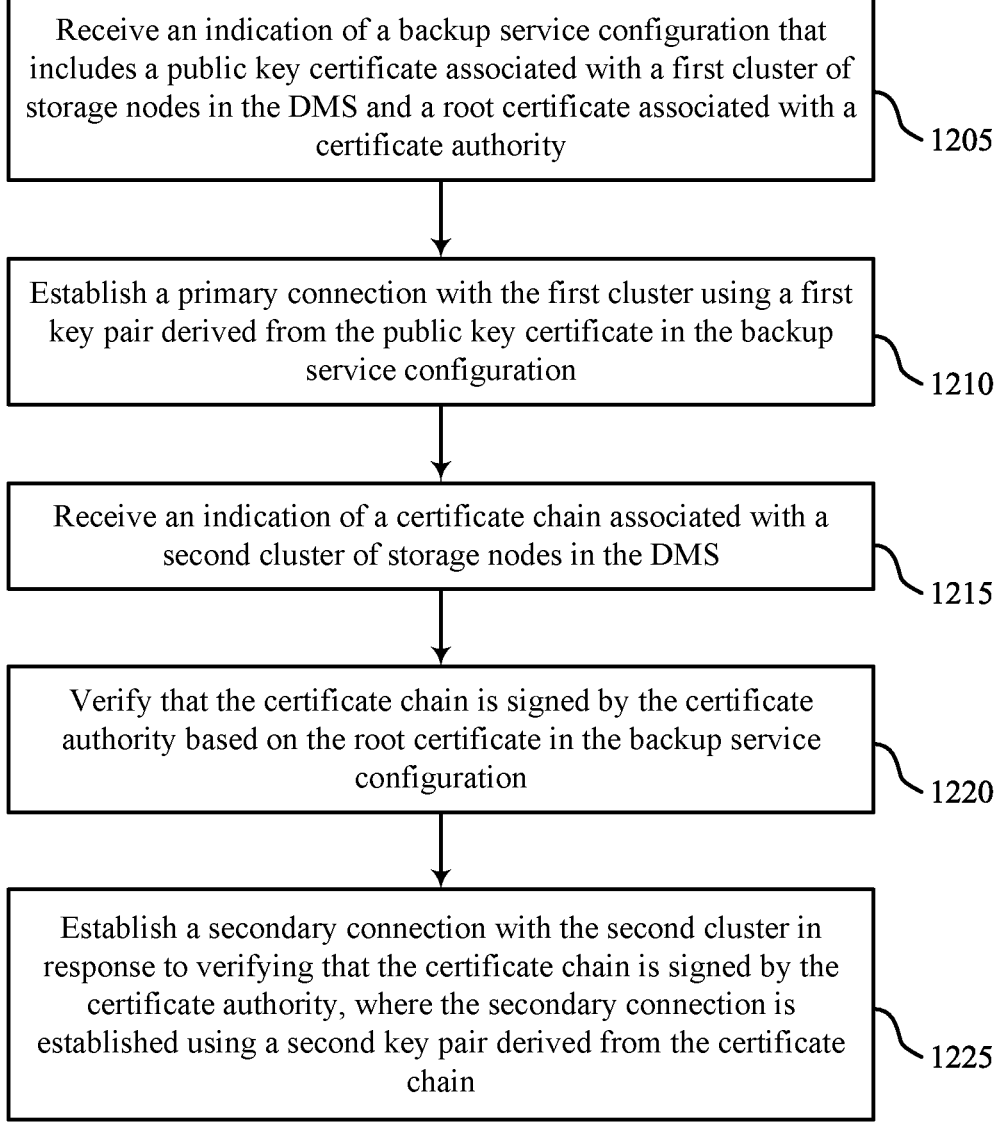

Receive an indication of a backup service configuration that includes a public key certificate associated with a first cluster of storage nodes in the DMS and a root certificate associated with a certificate authority

1205

Establish a primary connection with the first cluster using a first key pair derived from the public key certificate in the backup service configuration

1210

Receive an indication of a certificate chain associated with a second cluster of storage nodes in the DMS

1215

Verify that the certificate chain is signed by the certificate authority based on the root certificate in the backup service configuration

1220

Establish a secondary connection with the second cluster in response to verifying that the certificate chain is signed by the certificate authority, where the secondary connection is established using a second key pair derived from the certificate chain

TECHNIQUES FOR SECURE HOST CONNECTIVITY IN DISASTER RECOVERY SCENARIOS

FIELD OF TECHNOLOGY

The present disclosure relates generally to data management, and more specifically to techniques for secure host connectivity in disaster recovery scenarios.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

In some systems, a host node may establish a secure connection with a storage node using public key encryption techniques. However, if the storage node goes offline or experiences an operational failure, the host node may be susceptible to data loss, corruption, and other security threats.

BRIEF DESCRIPTION OF THE DRAWINGS

FIGS. 9 through 12 show flowcharts illustrating methods that support techniques for secure host connectivity in disaster recovery scenarios according to one or more aspects of the present disclosure.

DETAILED DESCRIPTION

Figure 1:
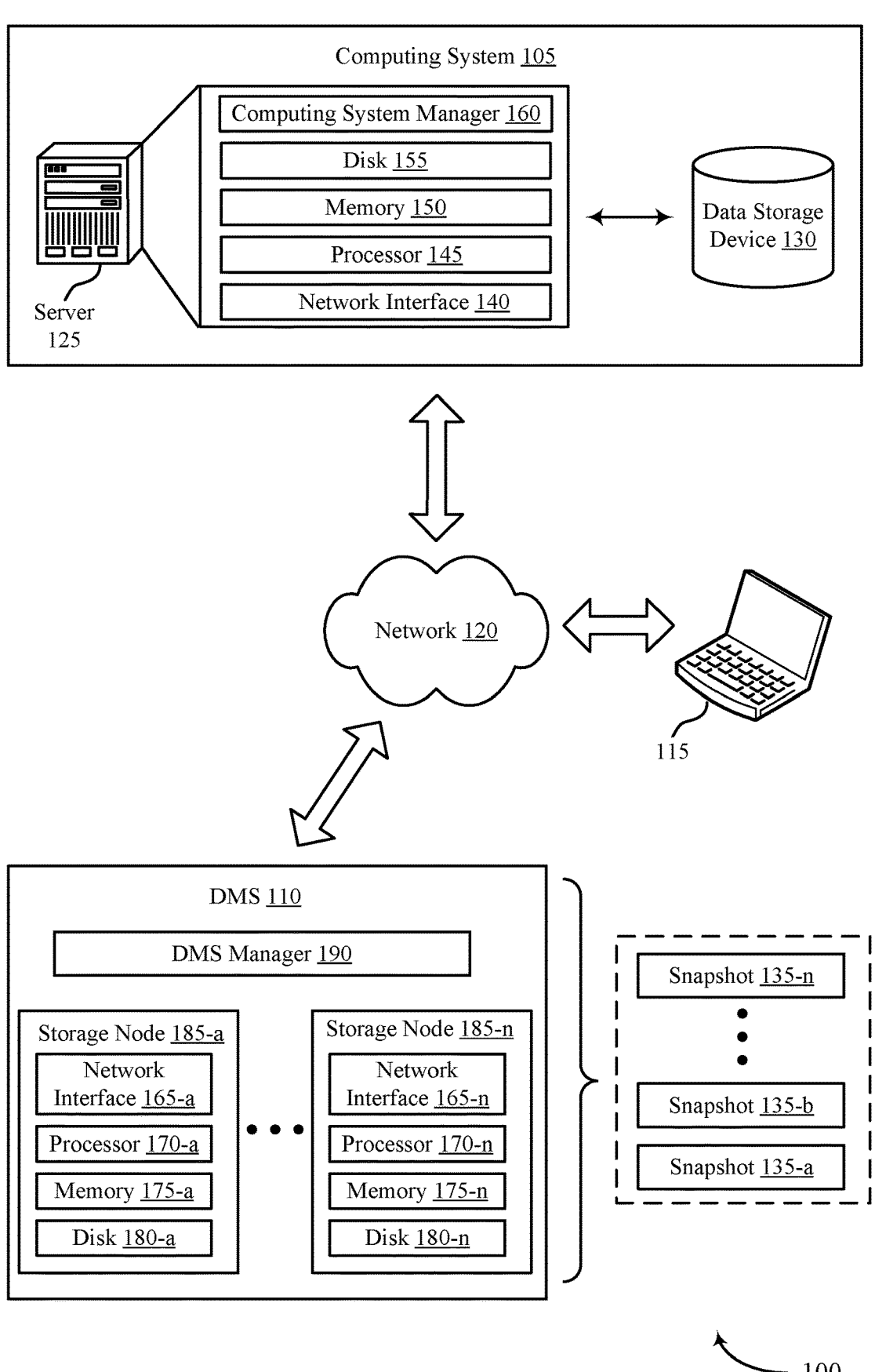
FIGS. 1 and 2 illustrate examples of computing environments that support techniques for secure host connectivity in disaster recovery scenarios according to one or more aspects of the present disclosure.

A data management system (DMS) may use clusters of storage nodes (virtual machines, physical machines, servers) to provide backup and recovery services for host nodes associated with a client of the DMS. To establish connectivity between a host node and a cluster of storage nodes in the DMS, a client may install a backup service configuration (also referred to as an agent or a package) on the host node. This backup service configuration may include a public key certificate associated with the cluster of storage nodes. Accordingly, the host node may use public key encryption techniques (asymmetric encryption) to establish a secure connection with the cluster of storage nodes. Once the host node has established secure connectivity with the cluster of storage nodes, the host node can use transport layer security (TLS) encryption techniques to exchange secure communications with the cluster of storage nodes.

In some cases, however, if one or more of the storage nodes go offline or experience an operational failure due to a power outage, a natural disaster, a cyberattack, or some other network malfunction, the host node may be exposed to data loss, corruption, malware, and other security threats. To re-establish secure connectivity with a different cluster of storage nodes in the DMS, the client may be required to manually install a new backup service configuration on the host node. For clients with hundreds or thousands of host nodes, manually reconfiguring each host node may be a tedious, error-prone, and time-consuming process. Thus, conventional techniques for disaster-related host migration may be inefficient and impractical for clients with many host nodes.

Aspects of the present disclosure support techniques for securely re-establishing a connection between one or more host nodes and a secondary cluster of storage nodes when the one or more host nodes become disconnected from a primary cluster of storage nodes. To support this functionality, each of the host nodes may be configured with a root certificate associated with a certificate authority. This root certificate can be used to verify other certificates signed by the certificate authority. Once the host nodes have the root certificate, the secondary cluster may obtain a certificate chain signed by the certificate authority. If the primary cluster becomes disconnected or goes offline, the secondary cluster can present this certificate chain to the host nodes. Accordingly, the host nodes can use the previously acquired root certificate to authenticate the certificate chain presented by the secondary cluster. After verifying the authenticity of the certificate chain, the host nodes can connect to the secondary cluster (without manual intervention).

Once the host nodes have established secure connectivity with the secondary cluster (by performing a TLS handshake procedure with the secondary cluster), the host nodes may use a symmetric key to exchange encrypted communications with the secondary cluster of storage nodes. The secondary cluster may be promoted to a primary connection (protection source) for the host nodes (protection targets) after the new connection is established. In some examples, a client associated with the host nodes may prompt or otherwise configure the secondary cluster to transmit a certificate signing request (CSR) to the certificate authority such that the secondary cluster can obtain the signed certificate chain (a list of certificates including the root certificate associated with the certificate authority and a public key certificate associated with the secondary cluster) from the certificate authority.

Aspects of the present disclosure may be implemented to realize one or more of the following advantages. The described techniques may enable a DMS to perform disaster-related host migration (migrating host nodes to a different cluster of storage nodes in the event of a disaster) with greater efficiency and reduced manual interaction. For example, if a primary cluster of storage nodes is damaged or loses power, the DMS can use the techniques described herein to transfer host nodes supported by the primary cluster to a secondary cluster of storage nodes in the DMS. More specifically, the host nodes can use a root certificate of a trusted certificate authority to verify the authenticity of a certificate chain presented by the secondary cluster. As a result, the host nodes can migrate from the primary cluster to the secondary cluster without manual interaction.

Aspects of the disclosure are initially described in the context of computing environments and network diagrams. Aspects of the disclosure are further illustrated by and described with reference to apparatus diagrams, system diagrams, and flowcharts that relate to techniques for secure host connectivity in disaster recovery scenarios.

FIG. 1 illustrates an example of a computing environment 100 that supports techniques for secure host connectivity in disaster recovery scenarios according to one or more aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memory 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash). A disk 180 may include one or more HDDs, one or more SDDs, or any combination thereof. Memory 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g. a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely.

In accordance with aspects of the present disclosure, the DMS 110 may transmit an indication of a backup service configuration to one or more host nodes associated with a client of the DMS 110. The backup service configuration (also referred to as an agent or package) may include a public key certificate associated with a first cluster of storage nodes 185 in the DMS 110 and a root certificate associated with a certificate authority. The DMS 110 may establish a first connection between the first cluster of storage nodes 185 and the one or more host nodes using a first key pair (a public key and a private key) derived from the public key certificate in the backup service configuration. A second cluster of storage nodes 185 in the DMS 110 may obtain a certificate chain (a list of digital certificates) signed by the certificate authority. If the first cluster of storage nodes 185 becomes disconnected from the one or more host nodes, the second cluster of storage nodes 185 may establish a second connection with the one or more host nodes by transmitting an indication of the signed certificate chain to the one or more host nodes.

Aspects of the computing environment 100 may be implemented to realize one or more of the following advantages. The techniques described with reference to FIG. 1 may enable the DMS 110 to perform disaster-related host migration (securely migrating host nodes to a backup cluster of storage nodes 185 in accordance with a failover scheme) with greater efficiency and reduced manual interaction. For example, if a primary cluster of storage nodes 185 is compromised, the DMS 110 can use the techniques described herein to transfer host nodes supported by the primary cluster to a secondary cluster of storage nodes in the DMS 110. More specifically, the host nodes can use a root certificate provided by the primary cluster to verify the authenticity of a certificate chain presented by the secondary cluster. As a result, the host nodes can migrate from the primary cluster to the secondary cluster with reduced manual interaction.

Figure 2:
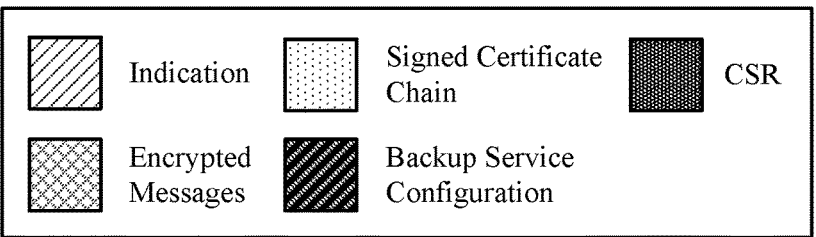
Figure 2:
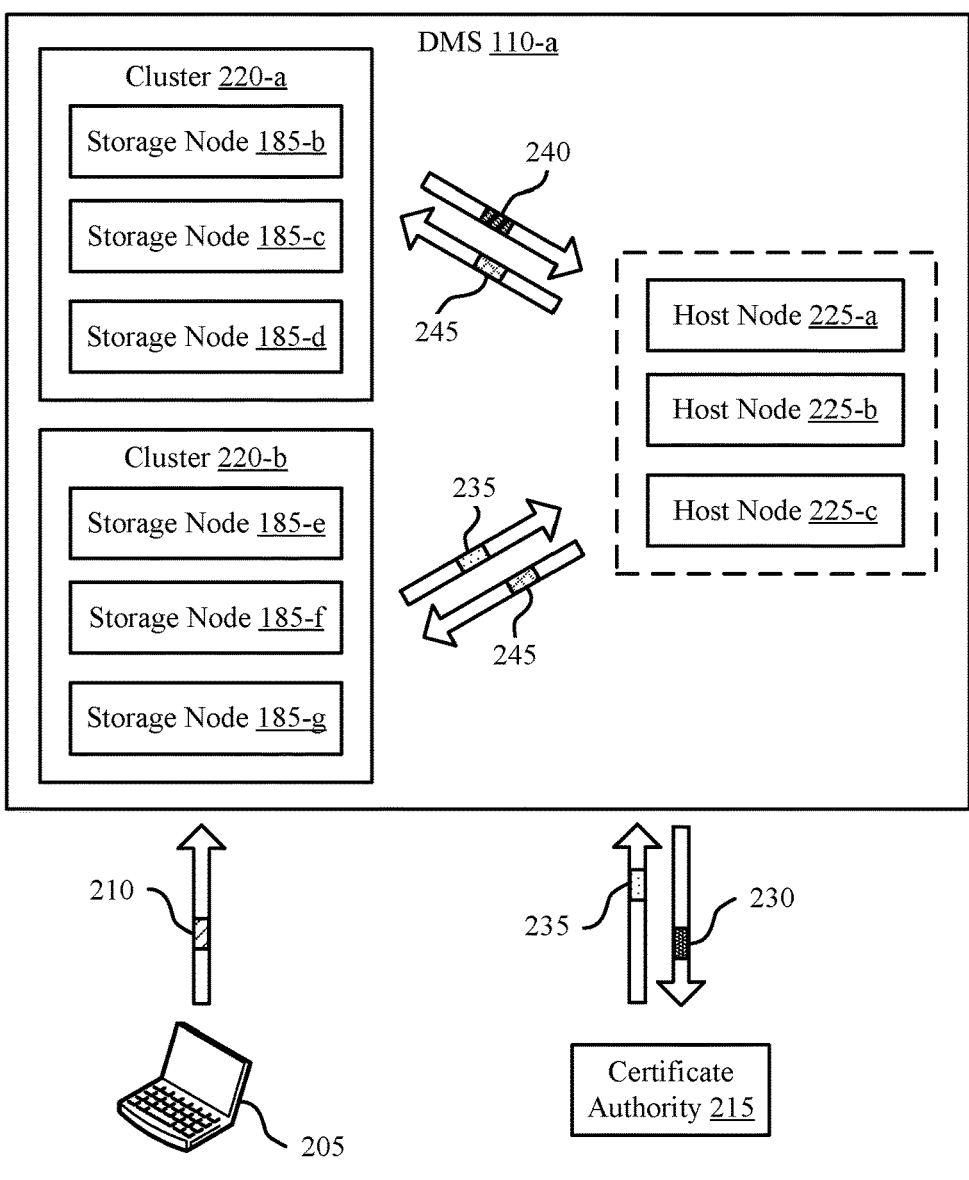

FIG. 2 illustrates an example of a computing environment 200 that supports techniques for secure host connectivity in disaster recovery scenarios according to one or more aspects of the present disclosure. The computing environment 200 may implement or be implemented by aspects of the computing environment 100. For example, the computing environment 200 may include a DMS 110-*a*, which may be an example of a DMS 110 described with reference to FIG. 1. The computing environment 200 may also include a storage node 185-*b*, a storage node 185-*c*, a storage node 185-*d*, a storage node 185-*e*, a storage node 185-*f*, and a storage node 185-*g*, which may be examples of the storage nodes 185 described with reference to FIG. 1. The storage nodes 185 may be partitioned (logically or physically) into a cluster 220-*a* and a cluster 220-*b*. The clusters 220 of storage nodes 185 may support backup and recovery services for a host node 225-*a*, a host node 225-*b*, and a host node 225-*c*.

The computing environment 200 may support techniques for securely re-establishing a connection between the host nodes 225 and the cluster 220-*b* (a secondary or backup cluster of storage nodes 185) when the host nodes 225 become disconnected from the cluster 220-*a* (a primary cluster of storage nodes 185). To support this functionality, each of the host nodes 225 may be configured with a root certificate associated with the certificate authority 215. This root certificate may be included in a backup service configuration 240 provided by the cluster 220-*a*. The root certificate can be used to verify the authenticity of other certificates signed by the certificate authority 215.

Once the host nodes 225 have the root certificate, the cluster 220-*b* may obtain a certificate chain 235 that is signed by the certificate authority 215. If the cluster 220-*a* becomes disconnected or goes offline, the cluster 220-*b* can present the certificate chain 235 to the host nodes 225. Accordingly, the host nodes 225 can use the previously acquired root certificate (from the backup service configuration 240) to authenticate the certificate chain 235 presented by the cluster 220-*b*. After verifying the authenticity of the certificate chain 235, the host nodes 225 can establish secure connectivity with the cluster 220-*b*.

After the host nodes 225 have established secure connectivity with the cluster 220-*b* (using TLS mutual authentication techniques), the host nodes 225 may use a symmetric key to exchange encrypted messages 245 with the cluster 220-*b*. In some examples, a client 205 associated with the host nodes 225 may prompt or otherwise configure the cluster 220-*b* to submit a CSR 230 to the certificate authority 215 by transmitting an indication 210 to the cluster 220-*b*. Upon receiving the CSR 230 from the cluster 220-*b*, the certificate authority 215 may provide the cluster 220-*b* with the certificate chain 235. As described herein, the certificate chain 235 may refer to a list (chain) of certificates that starts with the root certificate of the certificate authority and ends with a public key certificate of the cluster 220-*b*.

Aspects of the computing environment 200 may be implemented to realize one or more of the following advantages. The techniques described with reference to FIG. 2 may enable the DMS 110-*a* to provide secure host connectivity in disaster recovery scenarios (by securely migrating the host nodes 225 from the cluster 220-*a* to the cluster 220-*b*) with greater efficiency and reduced manual interaction. For example, if the cluster 220-*a* crashes or loses power, the DMS 110-*a* can use the techniques described herein to securely transfer the host nodes 225 from the cluster 220-*a* to the cluster 220-*b*. More specifically, the host nodes 225 can use a root certificate of the certificate authority 215 (included in the backup service configuration 240) to verify the authenticity of the certificate chain 235 presented by the cluster 220-*b*. As a result, the host nodes 225 can securely connect to the cluster 220-*b* without the client 205 manually reconfiguring each of the host nodes 225.

Figures 3A, 3B:
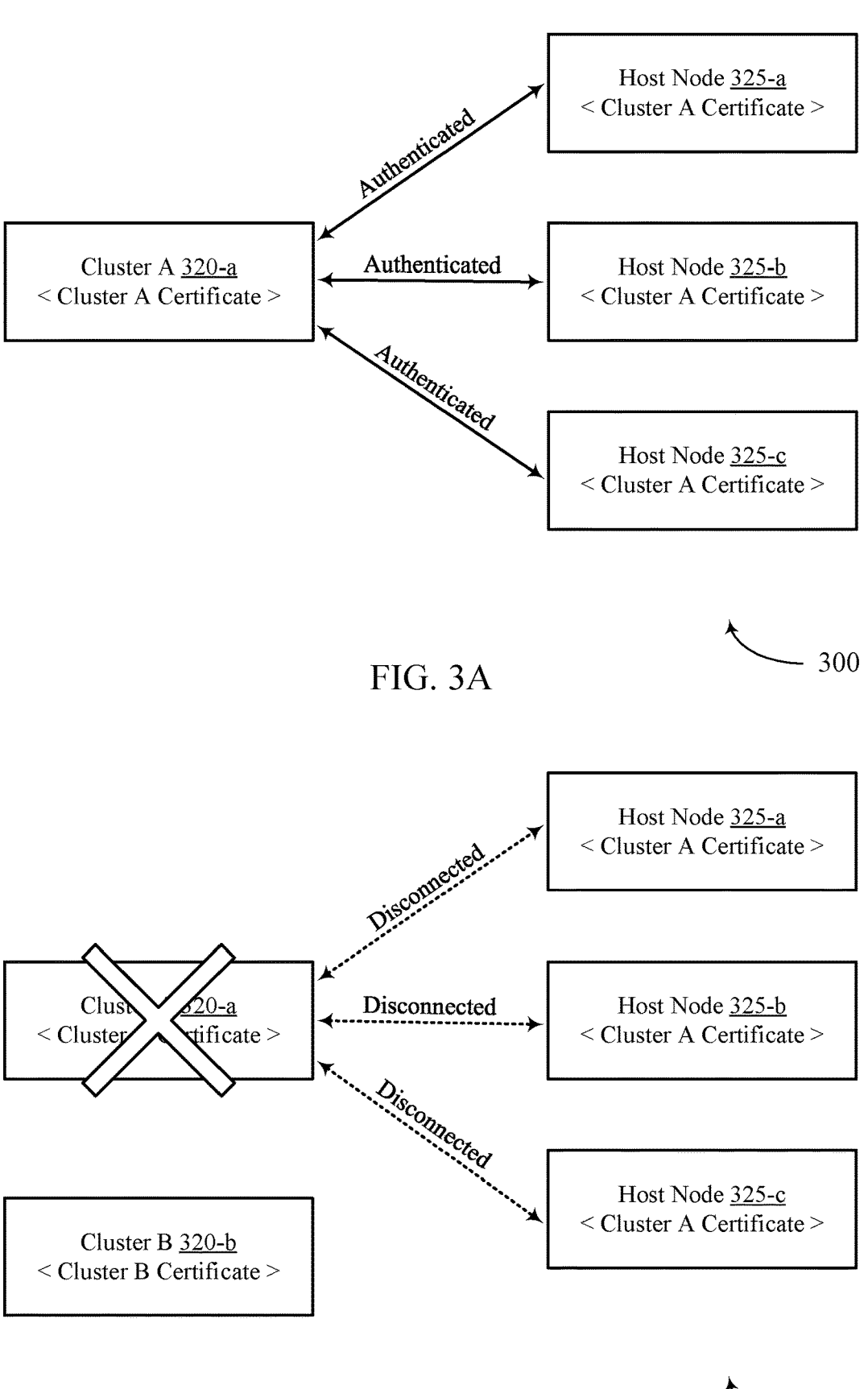
FIGS. 3A and 3B illustrate examples of network diagrams that support techniques for secure host connectivity in disaster recovery scenarios according to one or more aspects of the present disclosure.

FIGS. 3A and 3B illustrate examples of a network diagram 300 and a network diagram 301 that support techniques for secure host connectivity in disaster recovery scenarios according to one or more aspects of the present disclosure. The network diagram 300 and the network diagram 301 may implement or be implemented by aspects of the computing environment 100 or the computing environment 200. For example, the network diagram 300 and the network diagram 301 may include a cluster 320-*a* (cluster A) and a cluster 320-*b* (cluster B), which may be examples of the clusters 220 described with reference to FIG. 2. Each of the clusters 320 may include one or more storage nodes, which may be examples of the storage nodes 185 described with reference to FIGS. 1 and 2. The network diagram 300 and the network diagram 301 may also include a host node 325-*a* (host 1), a host node 325-*b* (host 2), and a host node 325-*c* (host 3), which may be examples of the host nodes 225 described with reference to FIG. 2.

In the example of FIG. 3A, a client or customer of a DMS (e.g., the DMS 110-*a* described with reference to FIG. 2) may have three host nodes 325 protected or otherwise supported by the cluster 320-*a* (also referred to as a cloud data management cluster) of storage nodes. To establish a secure connection between the host nodes 325 and the cluster 320-*a*, the client may download a backup service configuration (also referred to as an agent package) from the cluster 320-*a* and install the backup service configuration on each of the host nodes 325. Once installed, the contents of the backup service configuration may enable the host nodes 325 to establish a secure connection with the cluster 320-*a*. If, for example, the cluster 320-*a* goes down (becomes disconnected from the host nodes 325) or experiences some type of operational failure, the DMS may allocate the cluster 320-*b* (a backup or secondary cluster) to protect the host nodes 325, as illustrated in the example of FIG. 3B.

However, the host nodes 325 may be unable to communicate with the cluster 320-*b* because the agent (installed on each of the host nodes 325) may not trust a certificate of the cluster 320-*b* (Cluster B Certificate). That is, the host nodes 325 may be limited to trusting a certificate of the cluster 320-*a* (Cluster A Certificate). To establish connectivity between the host nodes 325 and the cluster 320-*b*, the client may be required to manually install an agent package (backup service configuration) from the cluster 320-*b*. Reconfiguring each of the host nodes 325 can be a tedious and time-intensive process for clients with many host nodes 325. Moreover, the process of re-installing a new agent package on each of the host nodes 325 can be hard to debug if re-installation of the agent package is unsuccessful.

The techniques described herein may enable the host nodes 325 to automatically establish connectivity with the cluster 320-*b* without compromising the security or integrity of the DMS. In accordance with aspects of the present disclosure, the client associated with the host nodes 325 may generate a root certificate (also referred to as a CA certificate or a root CA certificate) for the cluster 320-*b*. Alternatively, the client may use an existing certificate for the cluster 320-*b* (rather than generating a new root certificate). After the client has installed agents from the cluster 320-*a* (the initial cluster) on each of the host nodes 325, the client may add the root certificate of the trusted certificate authority to the cluster 320-*a* and set the root certificate as a secondary cluster certificate for all instances of the agent package. Once configured, the root certificate will be designated as a trusted certificate on each of the host nodes 325.

Accordingly, the client may update a certificate of the cluster 320-*b* (Cluster B Certificate) by getting the certificate signed by the certificate authority from which the root certificate was obtained. When new host nodes 325 are added, the cluster 320-*b* can be used to restore connectivity with these host nodes 325 in the event of a disaster. Initially, the cluster 320-*b* may be configured as a secondary connection for the host nodes 325. When the cluster 320-*b* re-establishes connectivity with the host nodes 325 (after the cluster 320-*a* is compromised), the client can promote the cluster 320-*b* to the primary connection for the host nodes 325. Thereafter, the client can securely and automatically connect the host nodes 325 to the cluster 320-*b* if the cluster 320-*a* becomes inoperable.

Aspects of the network diagram 300 and the network diagram 301 may be implemented to realize one or more of the following advantages. The techniques described with reference to FIGS. 3A and 3B may enable a DMS (e.g., the DMS 110-*a* described with reference to FIG. 2) to provide secure host connectivity in disaster recovery scenarios by securely migrating the host nodes 325 from the cluster 320-*a* to the cluster 320-*b* with greater efficiency and reduced manual interaction. For example, if the cluster 320-*a* becomes inoperable, the DMS can use the techniques described herein to securely transfer (migrate) the host nodes 325 from the cluster 320-*a* to the cluster 320-*b*. More specifically, the host nodes 325 can use a root certificate of a trusted certificate authority to verify the authenticity of a certificate chain presented by the cluster 320-*b*, which may enable the host nodes 325 to autonomously establish connectivity with the cluster 320-*b*.

Figures 4A, 4B:
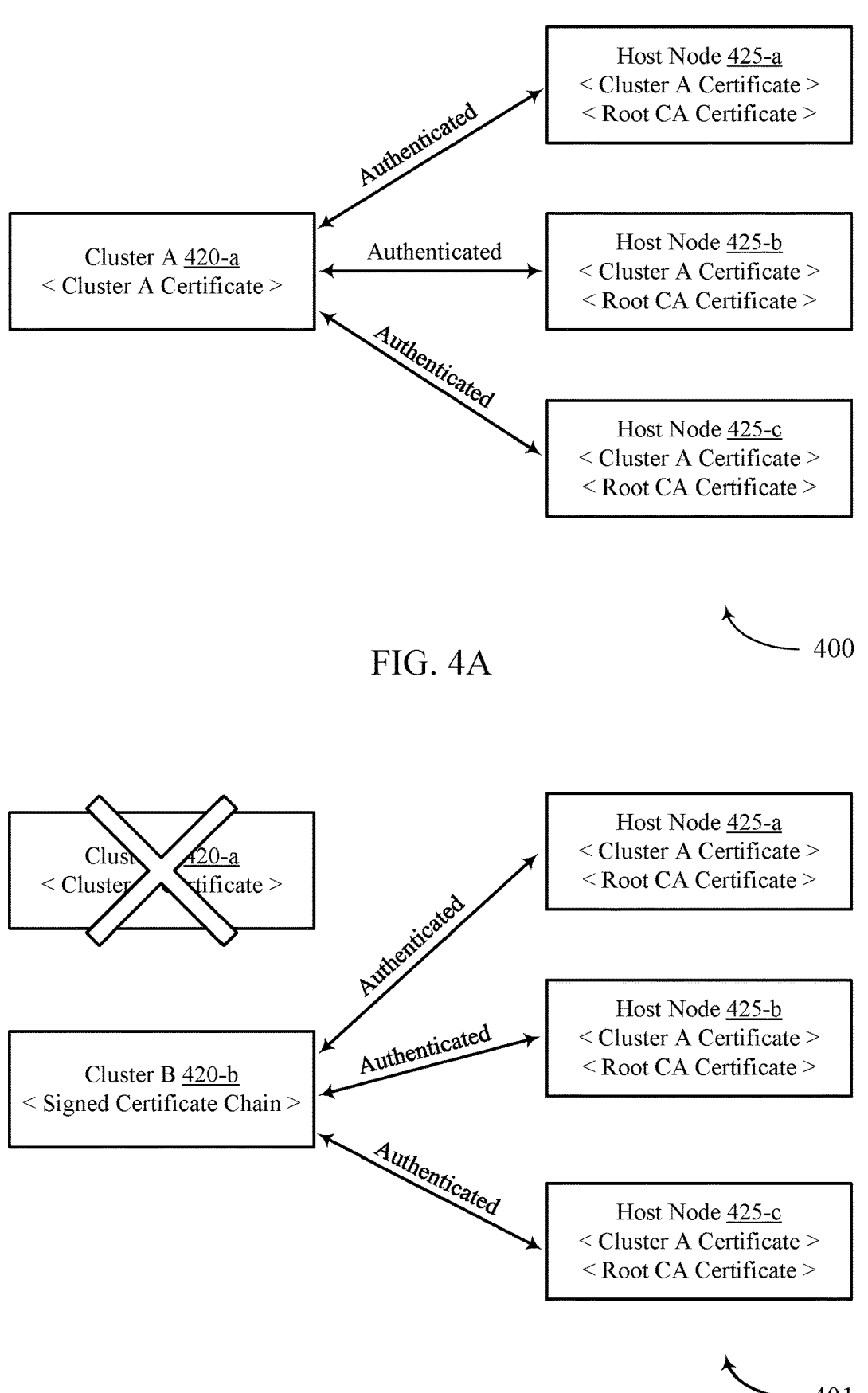
FIGS. 4A and 4B illustrate examples of network diagrams that support techniques for secure host connectivity in disaster recovery scenarios according to one or more aspects of the present disclosure.

FIGS. 4A and 4B illustrate examples of a network diagram 400 and a network diagram 401 that support techniques for secure host connectivity in disaster recovery scenarios according to one or more aspects of the present disclosure. The network diagram 400 and the network diagram 401 may implement or be implemented by aspects of the computing environment 100 or the computing environment 200. For example, the network diagram 400 and the network diagram 401 may include a cluster 420-*a* (cluster A) and a cluster 420-*b* (cluster B), which may be examples of the clusters 220 described with reference to FIG. 2. Each of the clusters 420 may include one or more storage nodes, which may be examples of the storage nodes 185 described with reference to FIGS. 1 and 2. The network diagram 400 and the network diagram 401 may also include a host node 425-*a* (host 1), a host node 425-*b* (host 2), and a host node 425-*c* (host 3), which may be examples of the host nodes 225 described with reference to FIG. 2.

The network diagram 400 illustrates the state of a DMS (e.g., the DMS 110-*a* described with reference to FIG. 2) after a root certificate of a trusted certificate authority has been added to the host nodes 425 and a primary connection has been successfully established between the cluster 420-*a* and each of the host nodes 425. The cluster 420-*a* may establish the primary connection by providing the host nodes 425 with a public key certificate associated with the cluster 420-*a*. As described herein, a public key certificate may refer to a digital certificate that includes or otherwise indicates a public key of the cluster 420-*a*. The network diagram 401 illustrates the state of the DMS after a secondary connection has been successfully established between the cluster 420-*b* and each of the host nodes 425, which may occur after the cluster 420-*a* becomes disconnected from the host nodes 425.

To establish connectivity between the host nodes 425 (protection targets) and one of the clusters 420, a client (e.g., the client 205 described with reference to FIG. 2) may install an agent (also referred to as a backup service configuration or package) on each of the host nodes 425. This agent securely manages operations on the host nodes 425. TLS mutual authentication can be used to facilitate secure communications between the host nodes 425 and the clusters 420. When generating a backup service package for installation on the host nodes 425, the cluster 420-*a* may add a corresponding cluster certificate (Cluster A Certificate) to the package. Once the package is installed on each of the host nodes 425, a key pair is generated using the cluster certificate. This key pair (a public key and a private key) may enable the agent on the host nodes 425 to communicate with the cluster 420-*a* (from which the agent was obtained). In the event of a disaster (when the cluster 420-*a* goes down), the host nodes 425 may lose connectivity with the cluster 420-*a*. Since the agent is configured to facilitate secure communications with the cluster 420-*a*, the host nodes 425 may be unable to communicate with other available clusters using this agent.

The techniques described herein may enable the host nodes 425 to establish connectivity (and subsequently exchange secure communications) with the cluster 420-*b* if the cluster 420-*a* becomes disconnected from the host nodes 425. Moreover, the described techniques may enable the host nodes 425 to securely migrate from the cluster 420-*a* to the cluster 420-*b* without the client manually reconfiguring each of the host nodes 425. To support this functionality, the client may generate or obtain a root certificate of a trusted certificate authority and mark the root certificate as a trusted certificate on the host nodes 425. If a disaster occurs and the cluster 420-*a* loses connectivity with the host nodes 425, the cluster 420-*b* can obtain a certificate chain signed by the certificate authority. This certificate chain can be validated by the agent using the previously acquired root certificate (also referred to herein as a CA certificate). After presenting the signed certificate chain to the host nodes 425, the cluster 420-*b* can use the signed certificate chain to establish secure connectivity with the agents that were previously installed on each of the host nodes 425.

Aspects of the network diagram 400 and the network diagram 401 may be implemented to realize one or more of the following advantages. The techniques described with reference to FIGS. 4A and 4B may enable a DMS to provide secure host connectivity in disaster recovery scenarios by securely migrating the host nodes 425 from the cluster 420-*a* to the cluster 420-*b* with greater efficiency and reduced manual interaction. For example, if the cluster 420-*a* goes offline, the DMS can use the techniques described herein to securely transfer (migrate) the host nodes 425 from the cluster 420-*a* to the cluster 420-*b*. More specifically, the host nodes 425 can use a root certificate provided by the cluster 420-*a* to verify the authenticity of a certificate chain presented by the cluster 420-*b* (e.g., the certificate chain 235 described with reference to FIG. 2), which may enable the host nodes 425 to re-establish connectivity with the cluster 420-*b*.

Figure 5:
FIG. 5 illustrates an example of a process flow that supports techniques for secure host connectivity in disaster recovery scenarios according to one or more aspects of the present disclosure.

FIG. 5 illustrates an example of a process flow 500 that supports techniques for secure host connectivity in disaster recovery scenarios according to one or more aspects of the present disclosure. The process flow 500 may implement or be implemented by aspects of the computing environment 100 or the computing environment 200. For example, the process flow 500 may include a cluster 520-*a* (a primary cluster of storage nodes) and a cluster 520-*b* (a secondary cluster of storage nodes), which may be examples of the clusters 220 described with reference to FIG. 2. The process flow 500 may also include host nodes 525, which may be examples of the host nodes 225 described with reference to FIG. 2. In the following description of the process flow 500, operations between the clusters 520 and the host nodes 525 may be performed at different times or in a different order (with respect to the order depicted in the example of FIG. 5). Additionally or alternatively, some operations between the clusters 520 and the host nodes 525 may be added to (or omitted) from the process flow 500.

At 505, each of the host nodes 525 may obtain and install a backup service configuration (e.g. the backup service configuration 240 described with reference to FIG. 2) from the cluster 520-*b*. The backup service configuration may include a private key certificate associated with the cluster 520-*a* and a root certificate (also referred to as a CA certificate or a root CA certificate) associated with a certificate authority that is trusted by the host nodes 525. At 510, the host nodes 525 may establish a primary connection with the cluster 520-*b* using a key pair (e.g., a private key and a public key) derived from the private key certificate in the backup service configuration. The host nodes 525 may establish the primary connection by performing a TLS handshake procedure with the cluster 520-*b*. At 515, the host nodes 525 may use a symmetric key to exchange encrypted messages (e.g., the encrypted messages 245 described with reference to FIG. 2) with the cluster 520-*a*. As described herein, the symmetric key may be used for both encryption and decryption. The host nodes 525 and the cluster 520-*a* may jointly (mutually) generate the symmetric key after establishing the primary connection.

At 530, the cluster 520-*b* may transmit a CSR to a certificate authority (e.g., the certificate authority 215 described with reference to FIG. 2). The cluster 520-*b* may transmit the CSR after receiving an indication (request, command) from a client device. At 535, the cluster 520-*b* may obtain a certificate chain (e.g., the certificate chain 235 described with reference to FIG. 2) signed by the certificate authority in response to the CSR. The signed certificate chain may be a list of certificates that includes the root certificate of the certificate authority and a public key certificate of the cluster 520-*b*. At 540, the host nodes 525 may become disconnected from the cluster 520-*a*. In some examples, the cluster 520-*a* may become disconnected from the host nodes 525 as a result of a power outage, a cyberattack, a natural disaster, a network malfunction, or any combination thereof. At 545, the cluster 520-*b* may transmit an indication of the signed certificate chain to the host nodes 525. At 550, the host nodes 525 may validate (verify) the signed certificate chain using the root certificate in the backup service configuration.

At 555, the host nodes 525 may establish a secondary connection with the cluster 520-*b* after validating the authenticity of the certificate chain presented by the cluster 520-*b*. The secondary connection may be established using a second key pair that is derived from the signed certificate chain. The cluster 520-*b* may establish the secondary connection with the host nodes 525 in accordance with a failover recovery scheme. In some examples, the host nodes 525 may designate the cluster 520-*b* as the new primary cluster for the host nodes 525 after the secondary connection is established. At 560, the host nodes 525 may exchange secure communications with the cluster 520-*b*. These communications may be encrypted and decrypted using a symmetric key that is generated (and mutually agreed upon) by the host nodes 525 and the cluster 520-*b*.

Aspects of the process flow 500 may be implemented to realize one or more of the following advantages. The techniques described with reference to FIG. 5 may enable a DMS to provide secure host connectivity in disaster recovery scenarios by securely migrating the host nodes 525 from the cluster 520-*a* to the cluster 520-*b* with greater efficiency and reduced manual interaction. For example, if the cluster 520-*a* loses connectivity with the host nodes 525, the DMS can use the techniques described herein to securely transfer (migrate) the host nodes 525 from the cluster 520-*a* to the cluster 520-*b*. More specifically, the host nodes 525 can use a root certificate provided by the cluster 520-*a* to verify the authenticity of a certificate chain presented by the cluster 520-*b*, which may enable the host nodes 525 to re-establish connectivity with the cluster 520-*b*.

Figure 6:
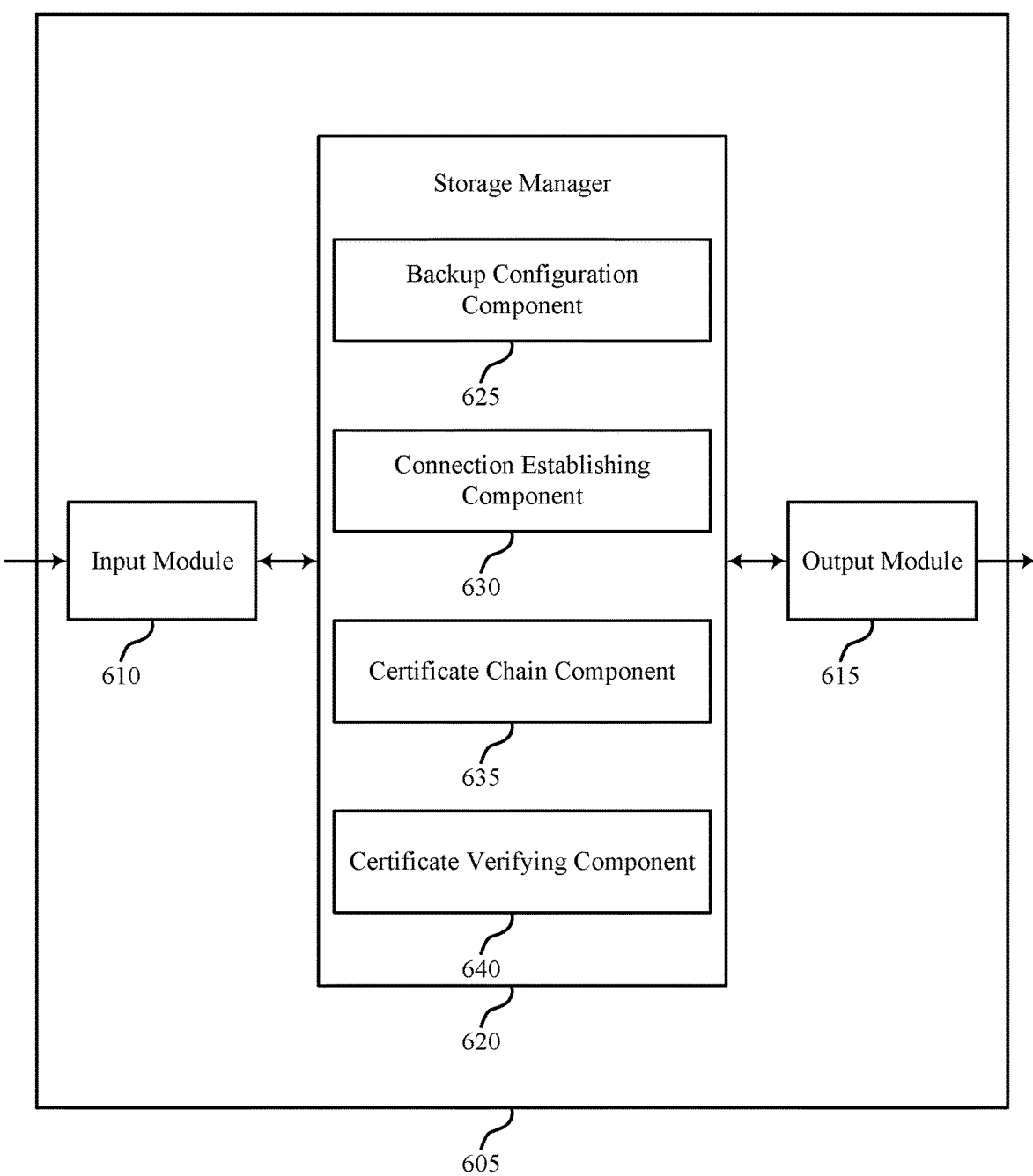
FIG. 6 shows a block diagram of an apparatus that supports techniques for secure host connectivity in disaster recovery scenarios according to one or more aspects of the present disclosure.

FIG. 6 shows a block diagram 600 of a system 605 that supports techniques for secure host connectivity in disaster recovery scenarios according to one or more aspects of the present disclosure. In some examples, the system 605 may be an example of aspects of one or more components of a DMS 110 described with reference to FIG. 1. The system 605 may include an input interface 610, an output interface 615, and a storage manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the storage manager 620 to support techniques for secure host connectivity in disaster recovery scenarios according to one or more aspects of the present disclosure. In some cases, the input interface 610 may be a component of a network interface 815, as described with reference to FIG. 8.

The output interface 615 may manage output signaling for the system 605. For example, the output interface 615 may receive signaling from other components of the system 605 (such as the storage manager 620), and may transmit such output signaling corresponding to (e.g., representative of or otherwise based on) such signaling to other systems or devices. In some cases, the output interface 615 may be a component of a network interface 815, as described with reference to FIG. 8.

The storage manager 620 may include a backup configuration component 625, a connection establishing component 630, a certificate chain component 635, a certificate verifying component 640, or any combination thereof. In some examples, the storage manager 620, or various components thereof, may be configured to perform various operations (e.g., receiving, monitoring, transmitting) using or otherwise in cooperation with the input interface 610, the output interface 615, or both. For example, the storage manager 620 may receive information from the input interface 610, send information to the output interface 615, or be integrated in combination with the input interface 610, the output interface 615, or both to receive information, transmit information, or perform various other operations as described herein.

The storage manager 620 may support techniques for establishing secure connectivity at a DMS in accordance with examples disclosed herein. The backup configuration component 625 may be configured as or otherwise support a means for transmitting, to one or more host nodes associated with a client of the DMS, an indication of a backup service configuration that includes a public key certificate associated with a first cluster of storage nodes in the DMS and a root certificate associated with a certificate authority. The connection establishing component 630 may be configured as or otherwise support a means for establishing a primary connection between the first cluster and the one or more host nodes using a first key pair derived from the public key certificate in the backup service configuration. The certificate chain component 635 may be configured as or otherwise support a means for obtaining, by a second cluster of storage nodes in the DMS, a certificate chain signed by the certificate authority. The connection establishing component 630 may be configured as or otherwise support a means for establishing a secondary connection between the second cluster and the one or more host nodes in response to the first cluster becoming disconnected from the one or more host nodes, where the secondary connection is established using a second key pair derived from the certificate chain signed by the certificate authority.

Additionally, or alternatively, the storage manager 620 may support establishing secure connectivity at a host node associated with a client of a DMS in accordance with examples disclosed herein. The backup configuration component 625 may be configured as or otherwise support a means for receiving an indication of a backup service configuration that includes a public key certificate associated with a first cluster of storage nodes in the DMS and a root certificate associated with a certificate authority. The connection establishing component 630 may be configured as or otherwise support a means for establishing a primary connection with the first cluster using a first key pair derived from the public key certificate in the backup service configuration. The certificate chain component 635 may be configured as or otherwise support a means for receiving an indication of a certificate chain associated with a second cluster of storage nodes in the DMS. The certificate verifying component 640 may be configured as or otherwise support a means for verifying that the certificate chain is signed by the certificate authority based on the root certificate in the backup service configuration. The connection establishing component 630 may be configured as or otherwise support a means for establishing a secondary connection with the second cluster in response to verifying that the certificate chain is signed by the certificate authority, where the secondary connection is established using a second key pair derived from the certificate chain.

Figure 7:
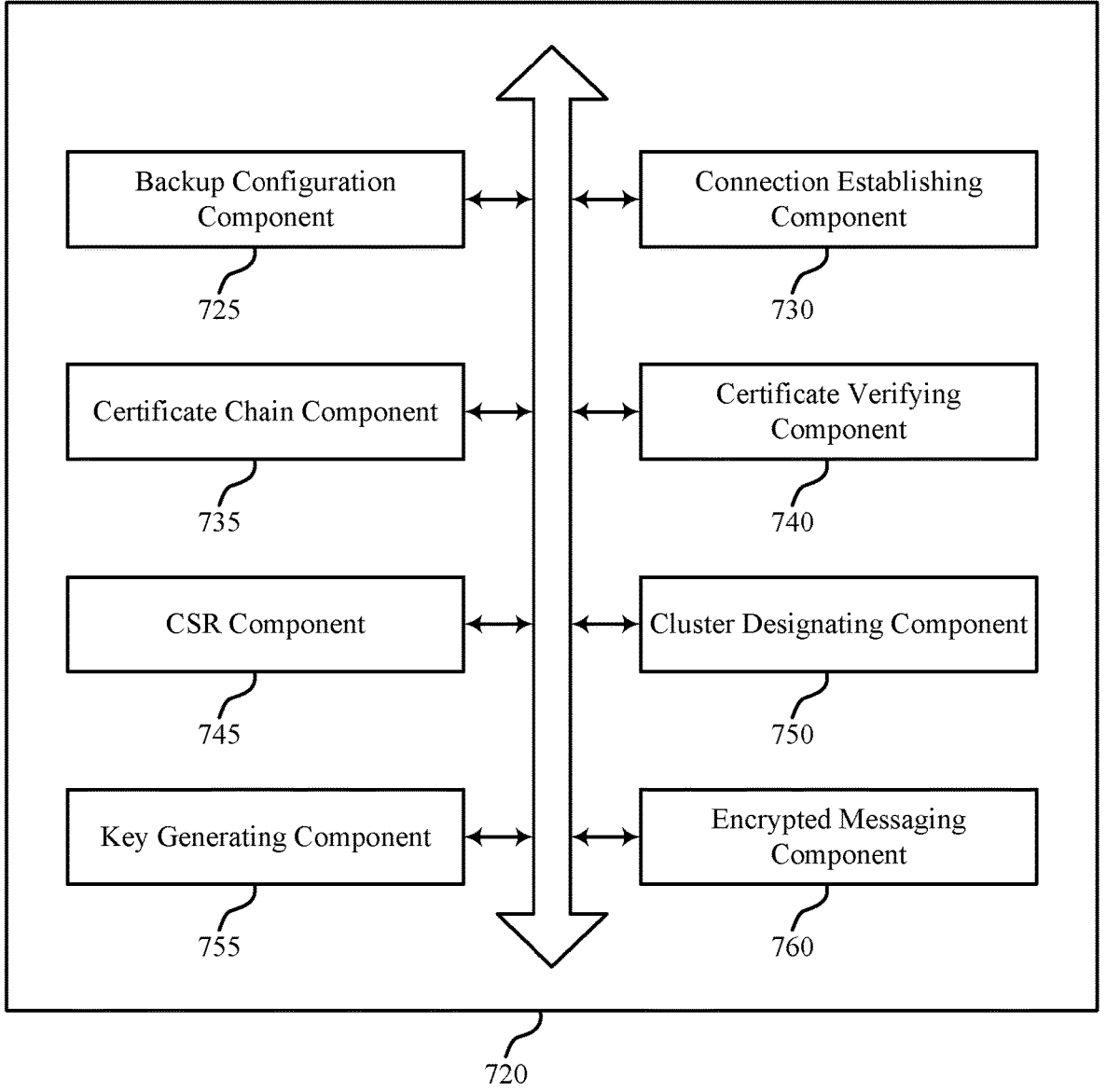
FIG. 7 shows a block diagram of a storage manager that supports techniques for secure host connectivity in disaster recovery scenarios according to one or more aspects of the present disclosure.

FIG. 7 shows a block diagram 700 of a storage manager 720 that supports techniques for secure host connectivity in disaster recovery scenarios according to one or more aspects of the present disclosure. The storage manager 720 may be an example of aspects of a storage manager or a storage manager 620, or both, as described herein. The storage manager 720, or various components thereof, may be an example of means for performing various aspects of techniques for secure host connectivity in disaster recovery scenarios as described herein. For example, the storage manager 720 may include a backup configuration component 725, a connection establishing component 730, a certificate chain component 735, a certificate verifying component 740, an CSR component 745, a cluster designating component 750, a key generating component 755, an encrypted messaging component 760, or any combination thereof. Each of these components may communicate, directly or indirectly, with one another (e.g., via one or more buses).

The storage manager 720 may support techniques for establishing secure connectivity at a DMS in accordance with examples disclosed herein. The backup configuration component 725 may be configured as or otherwise support a means for transmitting, to one or more host nodes associated with a client of the DMS, an indication of a backup service configuration that includes a public key certificate associated with a first cluster of storage nodes in the DMS and a root certificate associated with a certificate authority. The connection establishing component 730 may be configured as or otherwise support a means for establishing a primary connection between the first cluster and the one or more host nodes using a first key pair derived from the public key certificate in the backup service configuration. The certificate chain component 735 may be configured as or otherwise support a means for obtaining, by a second cluster of storage nodes in the DMS, a certificate chain signed by the certificate authority. In some examples, the connection establishing component 730 may be configured as or otherwise support a means for establishing a secondary connection between the second cluster and the one or more host nodes in response to the first cluster becoming disconnected from the one or more host nodes, where the secondary connection is established using a second key pair derived from the certificate chain signed by the certificate authority.

In some examples, the CSR component 745 may be configured as or otherwise support a means for receiving, from the client of the DMS, an indication to transmit a CSR to the certificate authority. In some examples, the CSR component 745 may be configured as or otherwise support a means for transmitting the CSR from the second cluster to the certificate authority based on receiving the indication, where obtaining the certificate chain signed by the certificate authority is based on transmitting the CSR.

In some examples, to support establishing the secondary connection, the connection establishing component 730 may be configured as or otherwise support a means for establishing the secondary connection between the second cluster of storage nodes in the DMS and the one or more host nodes associated with the client of the DMS in response to one or more of a service outage, a natural disaster, or an operational failure associated with the first cluster of storage nodes in the DMS.

In some examples, to support establishing the secondary connection, the connection establishing component 730 may be configured as or otherwise support a means for establishing the secondary connection between the second cluster of storage nodes in the DMS and the one or more host nodes associated with the client of the DMS in accordance with a failover recovery scheme of the DMS.

In some examples, the cluster designating component 750 may be configured as or otherwise support a means for designating the second cluster of storage nodes in the DMS as a primary cluster for the one or more host nodes associated with the client of the DMS after establishing the secondary connection between the second cluster of storage nodes in the DMS and the one or more host nodes associated with the client of the DMS.

In some examples, the key generating component 755 may be configured as or otherwise support a means for generating a symmetric key to use for subsequent communications between the second cluster of storage nodes in the DMS and the one or more host nodes associated with the client of the DMS after establishing the secondary connection between the second cluster and the one or more host nodes.

In some examples, the encrypted messaging component 760 may be configured as or otherwise support a means for exchanging at least one message between the second cluster of storage nodes in the DMS and the one or more host nodes associated with the client of the DMS after the secondary connection is established, where the at least one message is encrypted using the symmetric key.

In some examples, the secondary connection between the second cluster of storage nodes in the DMS and the one or more host nodes associated with the client of the DMS is established by performing a TLS handshake procedure between the second cluster of storage nodes in the DMS and the one or more host nodes associated with the client of the DMS.

In some examples, the certificate chain obtained by the second cluster of storage nodes in the DMS is a list of certificates that includes a public key certificate associated with the second cluster and the root certificate associated with the certificate authority. In some examples, the certificate authority is trusted by the one or more host nodes associated with the client of the DMS.

Additionally, or alternatively, the storage manager 720 may support techniques for establishing secure connectivity at a host node associated with a client of a DMS in accordance with examples disclosed herein. In some examples, the backup configuration component 725 may be configured as or otherwise support a means for receiving an indication of a backup service configuration that includes a public key certificate associated with a first cluster of storage nodes in the DMS and a root certificate associated with a certificate authority. In some examples, the connection establishing component 730 may be configured as or otherwise support a means for establishing a primary connection with the first cluster using a first key pair derived from the public key certificate in the backup service configuration. In some examples, the certificate chain component 735 may be configured as or otherwise support a means for receiving an indication of a certificate chain associated with a second cluster of storage nodes in the DMS. The certificate verifying component 740 may be configured as or otherwise support a means for verifying that the certificate chain is signed by the certificate authority based on the root certificate in the backup service configuration. In some examples, the connection establishing component 730 may be configured as or otherwise support a means for establishing a secondary connection with the second cluster in response to verifying that the certificate chain is signed by the certificate authority, where the secondary connection is established using a second key pair derived from the certificate chain.

In some examples, to support establishing the secondary connection, the connection establishing component 730 may be configured as or otherwise support a means for establishing the secondary connection with the second cluster of storage nodes in the DMS based on one or more of a service outage, a natural disaster, or an operational failure associated with the first cluster of storage nodes in the DMS.

In some examples, to support establishing the secondary connection, the connection establishing component 730 may be configured as or otherwise support a means for establishing the secondary connection with the second cluster of storage nodes in the DMS in accordance with a failover recovery scheme of the DMS.

In some examples, the cluster designating component 750 may be configured as or otherwise support a means for designating the second cluster of storage nodes in the DMS as a primary cluster for the host node after establishing the secondary connection with the second cluster of storage nodes in the DMS.

In some examples, the key generating component 755 may be configured as or otherwise support a means for generating a symmetric key to use for subsequent communications with the second cluster of storage nodes in the DMS after establishing the secondary connection with the second cluster of storage nodes in the DMS.

In some examples, the encrypted messaging component 760 may be configured as or otherwise support a means for exchanging at least one message with the second cluster of storage nodes in the DMS after the secondary connection is established, where the at least one message is encrypted using the symmetric key.

In some examples, the secondary connection with the second cluster of storage nodes in the DMS is established by performing a TLS handshake procedure with the second cluster of storage nodes in the DMS.

In some examples, the certificate chain is a list of certificates that includes a public key certificate associated with the second cluster and the root certificate associated with the certificate authority. In some examples, the certificate authority is trusted by the host node.

Figure 8:
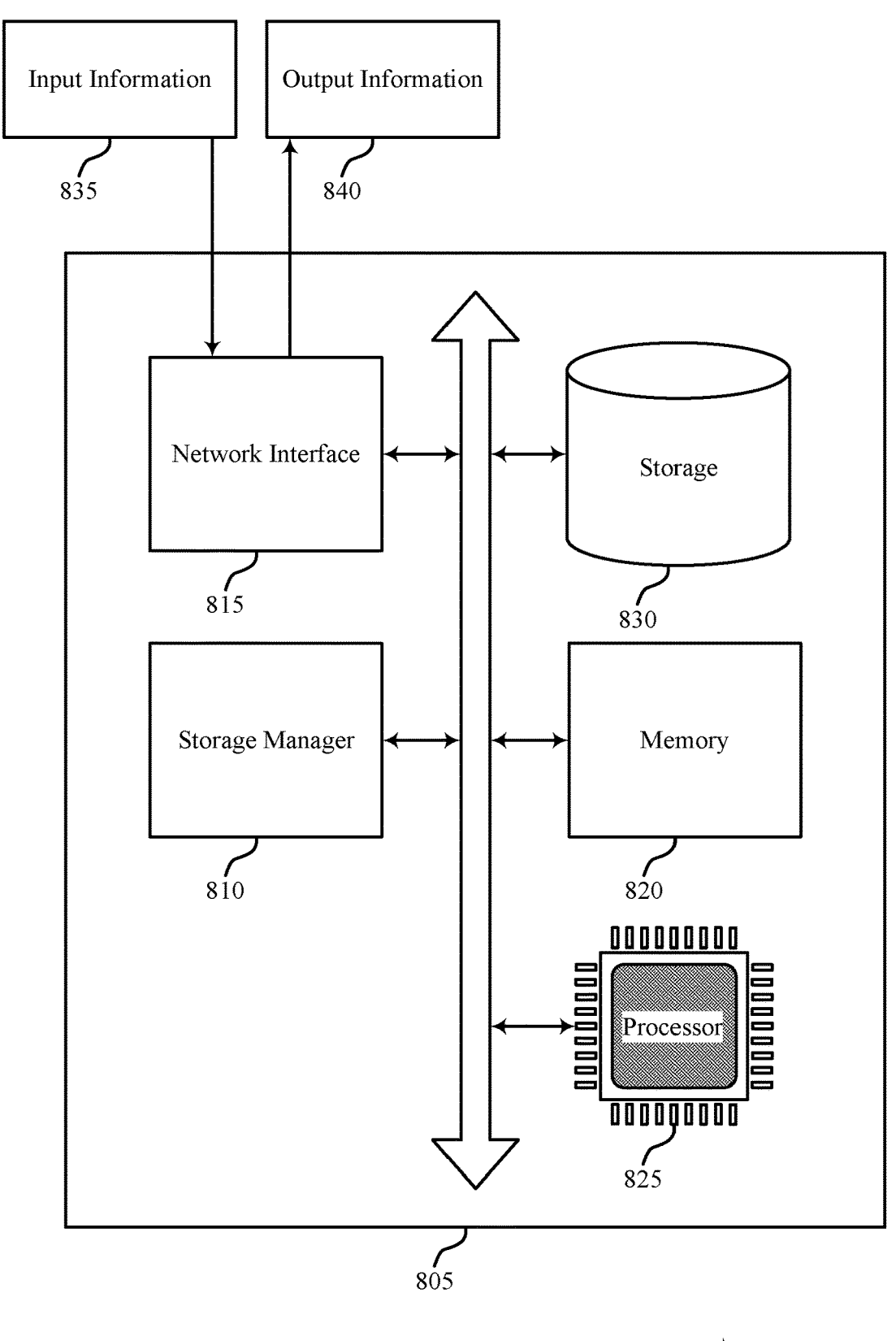
FIG. 8 shows a diagram of a system including a device that supports techniques for secure host connectivity in disaster recovery scenarios according to one or more aspects of the present disclosure.

FIG. 8 shows a block diagram 800 of a system 805 that supports techniques for secure host connectivity in disaster recovery scenarios according to one or more aspects of the present disclosure. The system 805 may be an example of or include aspects of a system 605, as described herein with reference to FIG. 6. The system 805 may include components for data management, including components such as a storage manager 810, a network interface 815, memory 820, processor 825, and storage 830. These components may be in electronic communication or otherwise coupled with each other (e.g., operatively, communicatively, functionally, electronically, electrically; via one or more buses, communications links, communications interfaces, or any combination thereof). Additionally, the components of the system 805 may comprise corresponding physical components or may be implemented as corresponding virtual components (e.g., components of one or more virtual machines). In some examples, the system 805 may be an example of aspects of one or more components of a DMS 110 described with reference to FIG. 1.

The network interface 815 may enable the system 805 to exchange information (e.g., input information 835, output information 840, or both) with other systems or devices (not shown). For example, the network interface 815 may enable the system 805 to connect to a network (e.g., a network 120 as described herein). The network interface 815 may include one or more wireless network interfaces, one or more wired network interfaces, or any combination thereof. In some examples, the network interface 815 may be an example of may be an example of aspects of one or more components described with reference to FIG. 1, such as one or more network interfaces 165.

Memory 820 may include RAM, ROM, or both. The memory 820 may store computer-readable, computer-executable software including instructions that, when executed, cause the processor 825 to perform various functions described herein. In some cases, the memory 820 may contain, among other things, a basic input/output system (BIOS), which may control basic hardware or software operation such as the interaction with peripheral components or devices. In some cases, the memory 820 may be an example of the memory 175 described with reference to FIG. 1.

The processor 825 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 825 may be configured to execute computer-readable instructions stored in a memory 820 to perform various functions (e.g., functions or tasks supporting techniques for secure host connectivity in disaster recovery scenarios). Though a single processor 825 is depicted in the example of FIG. 8, it is to be understood that the system 805 may include any quantity of one or more of processors 825 and that a group of processors 825 may collectively perform one or more functions ascribed herein to a processor, such as the processor 825. In some cases, the processor 825 may be an example of aspects of one or more components described with reference to FIG. 1, such as one or more processors 170.

Storage 830 may be configured to store data that is generated, processed, stored, or otherwise used by the system 805. In some cases, the storage 830 may include one or more HDDs, one or more SDDs, or both. In some examples, the storage 830 may be an example of a single database, a distributed database, multiple distributed databases, a data store, a data lake, or an emergency backup database. In some examples, the storage 830 may be an example of one or more components described with reference to FIG. 1, such as one or more network disks 180.

The storage manager 810 may support techniques for establishing secure connectivity at a DMS in accordance with examples disclosed herein. For example, the storage manager 810 may be configured as or otherwise support a means for transmitting, to one or more host nodes associated with a client of the DMS, an indication of a backup service configuration that includes a public key certificate associated with a first cluster of storage nodes in the DMS and a root certificate associated with a certificate authority. The storage manager 810 may be configured as or otherwise support a means for establishing a primary connection between the first cluster and the one or more host nodes using a first key pair derived from the public key certificate in the backup service configuration. The storage manager 810 may be configured as or otherwise support a means for obtaining, by a second cluster of storage nodes in the DMS, a certificate chain signed by the certificate authority. The storage manager 810 may be configured as or otherwise support a means for establishing a secondary connection between the second cluster and the one or more host nodes in response to the first cluster becoming disconnected from the one or more host nodes, where the secondary connection is established using a second key pair derived from the certificate chain signed by the certificate authority.

Additionally, or alternatively, the storage manager 810 may support techniques for establishing secure connectivity at a host node associated with a client of a DMS in accordance with examples disclosed herein. For example, the storage manager 810 may be configured as or otherwise support a means for receiving an indication of a backup service configuration that includes a public key certificate associated with a first cluster of storage nodes in the DMS and a root certificate associated with a certificate authority. The storage manager 810 may be configured as or otherwise support a means for establishing a primary connection with the first cluster using a first key pair derived from the public key certificate in the backup service configuration. The storage manager 810 may be configured as or otherwise support a means for receiving an indication of a certificate chain associated with a second cluster of storage nodes in the DMS. The storage manager 810 may be configured as or otherwise support a means for verifying that the certificate chain is signed by the certificate authority based on the root certificate in the backup service configuration. The storage manager 810 may be configured as or otherwise support a means for establishing a secondary connection with the second cluster in response to verifying that the certificate chain is signed by the certificate authority, where the secondary connection is established using a second key pair derived from the certificate chain.

By including or configuring the storage manager 810 in accordance with examples as described herein, the system 805 may support techniques for providing secure host connectivity in disaster recovery scenarios by securely migrating host nodes (e.g., the host nodes 225 described with reference to FIG. 2) from a primary cluster to a secondary cluster with greater efficiency and reduced manual interaction. For example, if the primary cluster loses connectivity with the host nodes, the system 805 can use the techniques described herein to securely transfer (migrate) the host nodes from the primary cluster to the secondary cluster. More specifically, the host nodes can use a root certificate associated with a certificate authority to verify the authenticity of a certificate chain presented by the secondary cluster, which may enable the host nodes to re-establish connectivity with the secondary cluster in the event of a disaster.

FIG. 9 shows a flowchart illustrating a method 900 that supports techniques for secure host connectivity in disaster recovery scenarios according to one or more aspects of the present disclosure. The operations of the method 900 may be implemented by a DMS or components thereof. For example, the operations of the method 900 may be performed by a DMS 110, as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include transmitting, to one or more host nodes associated with a client of the DMS, an indication of a backup service configuration that includes a public key certificate associated with a first cluster of storage nodes in the DMS and a root certificate associated with a certificate authority. The operations of 905 may be performed in accordance with examples disclosed herein. In some examples, the operations of 905 may be performed by a backup configuration component 725, as described with reference to FIG. 7.

At 910, the method may include establishing a primary connection between the first cluster and the one or more host nodes using a first key pair derived from the public key certificate in the backup service configuration. The operations of 910 may be performed in accordance with examples disclosed herein. In some examples, the operations of 910 may be performed by a connection establishing component 730, as described with reference to FIG. 7.

At 915, the method may include obtaining, by a second cluster of storage nodes in the DMS, a certificate chain signed by the certificate authority. The operations of 915 may be performed in accordance with examples disclosed herein. In some examples, the operations of 915 may be performed by a certificate chain component 735, as described with reference to FIG. 7.

At 920, the method may include establishing a secondary connection between the second cluster and the one or more host nodes in response to the first cluster becoming disconnected from the one or more host nodes, where the secondary connection is established using a second key pair derived from the certificate chain signed by the certificate authority. The operations of 920 may be performed in accordance with examples disclosed herein. In some examples, the operations of 920 may be performed by a connection establishing component 730, as described with reference to FIG. 7.

FIG. 10 shows a flowchart illustrating a method 1000 that supports techniques for secure host connectivity in disaster recovery scenarios according to one or more aspects of the present disclosure. The operations of the method 1000 may be implemented by a DMS or components thereof. For example, the operations of the method 1000 may be performed by a DMS 110, as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include transmitting, to one or more host nodes associated with a client of the DMS, an indication of a backup service configuration that includes a public key certificate associated with a first cluster of storage nodes in the DMS and a root certificate associated with a certificate authority. The operations of 1005 may be performed in accordance with examples disclosed herein. In some examples, the operations of 1005 may be performed by a backup configuration component 725, as described with reference to FIG. 7.

At 1010, the method may include establishing a primary connection between the first cluster and the one or more host nodes using a first key pair derived from the public key certificate in the backup service configuration. The operations of 1010 may be performed in accordance with examples disclosed herein. In some examples, the operations of 1010 may be performed by a connection establishing component 730, as described with reference to FIG. 7.

At 1015, the method may include receiving, from the client of the DMS, an indication to transmit a CSR to the certificate authority. The operations of 1015 may be performed in accordance with examples disclosed herein. In some examples, the operations of 1015 may be performed by an CSR component 745, as described with reference to FIG. 7.

At 1020, the method may include transmitting the CSR from a second cluster of storage nodes in the DMS to the certificate authority based on receiving the indication. The operations of 1020 may be performed in accordance with examples disclosed herein. In some examples, the operations of 1020 may be performed by an CSR component 745, as described with reference to FIG. 7.

At 1025, the method may include obtaining, by the second cluster and in response to the CSR, a certificate chain signed by the certificate authority. The operations of 1025 may be performed in accordance with examples disclosed herein. In some examples, the operations of 1025 may be performed by a certificate chain component 735, as described with reference to FIG. 7.

At 1030, the method may include establishing a secondary connection between the second cluster and the one or more host nodes in response to the first cluster becoming disconnected from the one or more host nodes, where the secondary connection is established using a second key pair derived from the certificate chain signed by the certificate authority. The operations of 1030 may be performed in accordance with examples disclosed herein. In some examples, the operations of 1030 may be performed by a connection establishing component 730, as described with reference to FIG. 7.

FIG. 11 shows a flowchart illustrating a method 1100 that supports techniques for secure host connectivity in disaster recovery scenarios according to one or more aspects of the present disclosure. The operations of the method 1100 may be implemented by a DMS or components thereof. For example, the operations of the method 1100 may be performed by a DMS 110, as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1105, the method may include transmitting, to one or more host nodes associated with a client of the DMS, an indication of a backup service configuration that includes a public key certificate associated with a first cluster of storage nodes in the DMS and a root certificate associated with a certificate authority. The operations of 1105 may be performed in accordance with examples disclosed herein. In some examples, the operations of 1105 may be performed by a backup configuration component 725, as described with reference to FIG. 7.

At 1110, the method may include establishing a primary connection between the first cluster and the one or more host nodes using a first key pair derived from the public key certificate in the backup service configuration. The operations of 1110 may be performed in accordance with examples disclosed herein. In some examples, the operations of 1110 may be performed by a connection establishing component 730, as described with reference to FIG. 7.

At 1115, the method may include obtaining, by a second cluster of storage nodes in the DMS, a certificate chain signed by the certificate authority. The operations of 1115 may be performed in accordance with examples disclosed herein. In some examples, the operations of 1115 may be performed by a certificate chain component 735, as described with reference to FIG. 7.

At 1120, the method may include establishing a secondary connection between the second cluster and the one or more host nodes in response to one or more of a service outage, a natural disaster, or an operational failure associated with the first cluster, where the secondary connection is established using a second key pair derived from the certificate chain signed by the certificate authority. The operations of 1120 may be performed in accordance with examples disclosed herein. In some examples, the operations of 1120 may be performed by a connection establishing component 730, as described with reference to FIG. 7.

At 1125, the method may include establishing the secondary connection between the second cluster of storage nodes in the DMS and the one or more host nodes associated with the client of the DMS in response to one or more of a service outage, a natural disaster, or an operational failure associated with the first cluster of storage nodes in the DMS. The operations of 1125 may be performed in accordance with examples disclosed herein. In some examples, aspects of the operations of 1125 may be performed by a connection establishing component 730 as described with reference to FIG. 7.

FIG. 12 shows a flowchart illustrating a method 1200 that supports techniques for secure host connectivity in disaster recovery scenarios according to one or more aspects of the present disclosure. The operations of the method 1200 may be implemented by a host node associated with a client of a DMS. For example, the operations of the method 1200 may be performed by a host node 225 described with reference to FIG. 2. In some examples, a host node may execute a set of instructions to control the functional elements of the host node to perform the described functions. Additionally, or alternatively, the host node may perform aspects of the described functions using special-purpose hardware.

At 1205, the method may include receiving an indication of a backup service configuration that includes a public key certificate associated with a first cluster of storage nodes in the DMS and a root certificate associated with a certificate authority. The operations of 1205 may be performed in accordance with examples disclosed herein. In some examples, the operations of 1205 may be performed by a backup configuration component 725, as described with reference to FIG. 7.

At 1210, the method may include establishing a primary connection with the first cluster using a first key pair derived from the public key certificate in the backup service configuration. The operations of 1210 may be performed in accordance with examples disclosed herein. In some examples, the operations of 1210 may be performed by a connection establishing component 730, as described with reference to FIG. 7.

At 1215, the method may include receiving an indication of a certificate chain associated with a second cluster of storage nodes in the DMS. The operations of 1215 may be performed in accordance with examples disclosed herein. In some examples, the operations of 1215 may be performed by a certificate chain component 735, as described with reference to FIG. 7.

At 1220, the method may include verifying that the certificate chain is signed by the certificate authority based on the root certificate in the backup service configuration. The operations of 1220 may be performed in accordance with examples disclosed herein. In some examples, the operations of 1220 may be performed by a certificate verifying component 740, as described with reference to FIG. 7.

At 1225, the method may include establishing a secondary connection with the second cluster in response to verifying that the certificate chain is signed by the certificate authority, where the secondary connection is established using a second key pair derived from the certificate chain. The operations of 1225 may be performed in accordance with examples disclosed herein. In some examples, the operations of 1225 may be performed by a connection establishing component 730, as described with reference to FIG. 7.

A method for establishing secure connectivity at a DMS is described. The method may include transmitting, to one or more host nodes associated with a client of the DMS, an indication of a backup service configuration that includes a public key certificate associated with a first cluster of storage nodes in the DMS and a root certificate associated with a certificate authority. The method may further include establishing a primary connection between the first cluster and the one or more host nodes using a first key pair derived from the public key certificate in the backup service configuration. The method may further include obtaining, by a second cluster of storage nodes in the DMS, a certificate chain signed by the certificate authority. The method may further include establishing a secondary connection between the second cluster and the one or more host nodes in response to the first cluster becoming disconnected from the one or more host nodes, where the secondary connection is established using a second key pair derived from the certificate chain signed by the certificate authority.

An apparatus for establishing secure connectivity at a DMS is described. The apparatus may include a processor, memory coupled with the processor, and instructions stored in the memory. The instructions may be executable by the processor to cause the apparatus to transmit, to one or more host nodes associated with a client of the DMS, an indication of a backup service configuration that includes a public key certificate associated with a first cluster of storage nodes in the DMS and a root certificate associated with a certificate authority. The instructions may be further executable by the processor to cause the apparatus to establish a primary connection between the first cluster and the one or more host nodes using a first key pair derived from the public key certificate in the backup service configuration. The instructions may be further executable by the processor to cause the apparatus to obtain, by a second cluster of storage nodes in the DMS, a certificate chain signed by the certificate authority. The instructions may be further executable by the processor to cause the apparatus to establish a secondary connection between the second cluster and the one or more host nodes in response to the first cluster becoming disconnected from the one or more host nodes, where the secondary connection is established using a second key pair derived from the certificate chain signed by the certificate authority.

Another apparatus for establishing secure connectivity at a DMS is described. The apparatus may include means for transmitting, to one or more host nodes associated with a client of the DMS, an indication of a backup service configuration that includes a public key certificate associated with a first cluster of storage nodes in the DMS and a root certificate associated with a certificate authority. The apparatus may further include means for establishing a primary connection between the first cluster and the one or more host nodes using a first key pair derived from the public key certificate in the backup service configuration. The apparatus may further include means for obtaining, by a second cluster of storage nodes in the DMS, a certificate chain signed by the certificate authority. The apparatus may further include means for establishing a secondary connection between the second cluster and the one or more host nodes in response to the first cluster becoming disconnected from the one or more host nodes, where the secondary connection is established using a second key pair derived from the certificate chain signed by the certificate authority.

A non-transitory computer-readable medium storing code for establishing secure connectivity at a DMS is described. The code may include instructions executable by a processor to transmit, to one or more host nodes associated with a client of the DMS, an indication of a backup service configuration that includes a public key certificate associated with a first cluster of storage nodes in the DMS and a root certificate associated with a certificate authority. The instructions may be further executable by the processor to establish a primary connection between the first cluster and the one or more host nodes using a first key pair derived from the public key certificate in the backup service configuration. The instructions may be further executable by the processor to obtain, by a second cluster of storage nodes in the DMS, a certificate chain signed by the certificate authority. The instructions may be further executable by the processor to establish a secondary connection between the second cluster and the one or more host nodes in response to the first cluster becoming disconnected from the one or more host nodes, where the secondary connection is established using a second key pair derived from the certificate chain signed by the certificate authority.

Some examples of the method, apparatuses, and non-transitory computer-readable medium described herein may further include operations, features, means, or instructions for receiving, from the client of the DMS, an indication to transmit a CSR to the certificate authority.

Some examples of the method, apparatuses, and non-transitory computer-readable medium described herein may further include operations, features, means, or instructions for transmitting the CSR from the second cluster to the certificate authority based on receiving the indication, where obtaining the certificate chain signed by the certificate authority is based on transmitting the CSR.

In some examples of the method, apparatuses, and non-transitory computer-readable medium described herein, establishing the secondary connection may include operations, features, means, or instructions for establishing the secondary connection between the second cluster of storage nodes in the DMS and the one or more host nodes associated with the client of the DMS in response to one or more of a service outage, a natural disaster, or an operational failure associated with the first cluster of storage nodes in the DMS.

In some examples of the method, apparatuses, and non-transitory computer-readable medium described herein, establishing the secondary connection may include operations, features, means, or instructions for establishing the secondary connection between the second cluster of storage nodes in the DMS and the one or more host nodes associated with the client of the DMS in accordance with a failover recovery scheme of the DMS.

Some examples of the method, apparatuses, and non-transitory computer-readable medium described herein may further include operations, features, means, or instructions for designating the second cluster of storage nodes in the DMS as a primary cluster for the one or more host nodes associated with the client of the DMS after establishing the secondary connection between the second cluster of storage nodes in the DMS and the one or more host nodes associated with the client of the DMS.

Some examples of the method, apparatuses, and non-transitory computer-readable medium described herein may further include operations, features, means, or instructions for generating a symmetric key to use for subsequent communications between the second cluster of storage nodes in the DMS and the one or more host nodes associated with the client of the DMS after establishing the secondary connection between the second cluster and the one or more host nodes.

Some examples of the method, apparatuses, and non-transitory computer-readable medium described herein may further include operations, features, means, or instructions for exchanging at least one message between the second cluster of storage nodes in the DMS and the one or more host nodes associated with the client of the DMS after the secondary connection is established, where the at least one message is encrypted using the symmetric key.

In some examples of the method, apparatuses, and non-transitory computer-readable medium described herein, the secondary connection between the second cluster of storage nodes in the DMS and the one or more host nodes associated with the client of the DMS is established by performing a TLS handshake procedure between the second cluster of storage nodes in the DMS and the one or more host nodes associated with the client of the DMS.

In some examples of the method, apparatuses, and non-transitory computer-readable medium described herein, the certificate chain obtained by the second cluster of storage nodes in the DMS is a list of certificates that includes a public key certificate associated with the second cluster and the root certificate associated with the certificate authority.

In some examples of the method, apparatuses, and non-transitory computer-readable medium described herein, the certificate authority may be trusted by the one or more host nodes associated with the client of the DMS.

A method for establishing secure connectivity at a host node associated with a client of a DMS is described. The method may include receiving an indication of a backup service configuration that includes a public key certificate associated with a first cluster of storage nodes in the DMS and a root certificate associated with a certificate authority. The method may further include establishing a primary connection with the first cluster using a first key pair derived from the public key certificate in the backup service configuration. The method may further include receiving an indication of a certificate chain associated with a second cluster of storage nodes in the DMS. The method may further include verifying that the certificate chain is signed by the certificate authority based on the root certificate in the backup service configuration. The method may further include establishing a secondary connection with the second cluster in response to verifying that the certificate chain is signed by the certificate authority, where the secondary connection is established using a second key pair derived from the certificate chain.

An apparatus for establishing secure connectivity at a host node associated with a client of a DMS is described. The apparatus may include a processor, memory coupled with the processor, and instructions stored in the memory. The instructions may be executable by the processor to cause the apparatus to receive an indication of a backup service configuration that includes a public key certificate associated with a first cluster of storage nodes in the DMS and a root certificate associated with a certificate authority. The instructions may be further executable by the processor to cause the apparatus to establish a primary connection with the first cluster using a first key pair derived from the public key certificate in the backup service configuration. The instructions may be further executable by the processor to cause the apparatus to receive an indication of a certificate chain associated with a second cluster of storage nodes in the DMS. The instructions may be further executable by the processor to cause the apparatus to verify that the certificate chain is signed by the certificate authority based on the root certificate in the backup service configuration. The instructions may be further executable by the processor to cause the apparatus to establish a secondary connection with the second cluster in response to verifying that the certificate chain is signed by the certificate authority, where the secondary connection is established using a second key pair derived from the certificate chain.

Another apparatus for establishing secure connectivity at a host node associated with a client of a DMS is described. The apparatus may include means for receiving an indication of a backup service configuration that includes a public key certificate associated with a first cluster of storage nodes in the DMS and a root certificate associated with a certificate authority. The apparatus may further include means for establishing a primary connection with the first cluster using a first key pair derived from the public key certificate in the backup service configuration. The apparatus may further include means for receiving an indication of a certificate chain associated with a second cluster of storage nodes in the DMS. The apparatus may further include means for verifying that the certificate chain is signed by the certificate authority based on the root certificate in the backup service configuration. The apparatus may further include means for establishing a secondary connection with the second cluster in response to verifying that the certificate chain is signed by the certificate authority, where the secondary connection is established using a second key pair derived from the certificate chain.

A non-transitory computer-readable medium storing code for establishing secure connectivity at a host node associated with a client of a DMS is described. The code may include instructions executable by a processor to receive an indication of a backup service configuration that includes a public key certificate associated with a first cluster of storage nodes in the DMS and a root certificate associated with a certificate authority. The instructions may be further executable by the processor to establish a primary connection with the first cluster using a first key pair derived from the public key certificate in the backup service configuration. The instructions may be further executable by the processor to receive an indication of a certificate chain associated with a second cluster of storage nodes in the DMS. The instructions may be further executable by the processor to verify that the certificate chain is signed by the certificate authority based on the root certificate in the backup service configuration. The instructions may be further executable by the processor to establish a secondary connection with the second cluster in response to verifying that the certificate chain is signed by the certificate authority, where the secondary connection is established using a second key pair derived from the certificate chain.

In some examples of the method, apparatuses, and non-transitory computer-readable medium described herein, establishing the secondary connection may include operations, features, means, or instructions for establishing the secondary connection with the second cluster of storage nodes in the DMS based on one or more of a service outage, a natural disaster, or an operational failure associated with the first cluster of storage nodes in the DMS.

In some examples of the method, apparatuses, and non-transitory computer-readable medium described herein, establishing the secondary connection may include operations, features, means, or instructions for establishing the secondary connection with the second cluster of storage nodes in the DMS in accordance with a failover recovery scheme of the DMS.

Some examples of the method, apparatuses, and non-transitory computer-readable medium described herein may further include operations, features, means, or instructions for designating the second cluster of storage nodes in the DMS as a primary cluster for the host node after establishing the secondary connection with the second cluster of storage nodes in the DMS.

Some examples of the method, apparatuses, and non-transitory computer-readable medium described herein may further include operations, features, means, or instructions for generating a symmetric key to use for subsequent communications with the second cluster of storage nodes in the DMS after establishing the secondary connection with the second cluster of storage nodes in the DMS.

Some examples of the method, apparatuses, and non-transitory computer-readable medium described herein may further include operations, features, means, or instructions for exchanging at least one message with the second cluster of storage nodes in the DMS after the secondary connection is established, where the at least one message is encrypted using the symmetric key.

In some examples of the method, apparatuses, and non-transitory computer-readable medium described herein, the secondary connection with the second cluster of storage nodes in the DMS may be established by performing a TLS handshake procedure with the second cluster of storage nodes in the DMS.

In some examples of the method, apparatuses, and non-transitory computer-readable medium described herein, the certificate chain is a list of certificates that includes a public key certificate associated with the second cluster and the root certificate associated with the certificate authority.

In some examples of the method, apparatuses, and non-transitory computer-readable medium described herein, the certificate authority may be trusted by the host node.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for establishing secure connectivity at a data management system, comprising:

transmitting, to one or more host nodes associated with a client of the data management system, an indication of a backup service configuration that includes a public key certificate associated with a first cluster of storage nodes in the data management system and a root certificate associated with a certificate authority;

establishing a primary connection between the first cluster and the one or more host nodes using a first key pair derived from the public key certificate in the backup service configuration, wherein the one or more host nodes are external to the first cluster;

receiving, from the client of the data management system, an indication to transmit a certificate signing request to the certificate authority;

transmitting the certificate signing request from a second cluster of storage nodes in the data management system to the certificate authority based at least in part on receiving the indication;

obtaining, by the second cluster of storage nodes in the data management system, a certificate chain signed by the certificate authority based at least in part on transmitting the certificate signing request; and establishing a secondary connection between the second cluster and the one or more host nodes in response to the first cluster becoming disconnected from the one or more host nodes based at least in part on a failure of the primary connection, wherein the secondary connection is established using a second key pair derived from the certificate chain signed by the certificate authority.

2. The method of claim 1, wherein establishing the secondary connection comprises:

establishing the secondary connection between the second cluster of storage nodes in the data management system and the one or more host nodes associated with the client of the data management system in response to one or more of a service outage, a natural disaster, or an operational failure associated with the first cluster of storage nodes in the data management system.

3. The method of claim 1, wherein establishing the secondary connection comprises:

establishing the secondary connection between the second cluster of storage nodes in the data management system and the one or more host nodes associated with the client of the data management system in accordance with a failover recovery scheme of the data management system.

4. The method of claim 1, further comprising:

designating the second cluster of storage nodes in the data management system as a primary cluster for the one or more host nodes associated with the client of the data management system after establishing the secondary connection between the second cluster of storage nodes in the data management system and the one or more host nodes associated with the client of the data management system.

5. The method of claim 1, further comprising:

generating a symmetric key to use for subsequent communications between the second cluster of storage nodes in the data management system and the one or more host nodes associated with the client of the data management system after establishing the secondary connection between the second cluster and the one or more host nodes.

6. The method of claim 5, further comprising:

exchanging at least one message between the second cluster of storage nodes in the data management system and the one or more host nodes associated with the client of the data management system after the secondary connection is established, wherein the at least one message is encrypted using the symmetric key.

7. The method of claim 1, wherein the secondary connection between the second cluster of storage nodes in the data management system and the one or more host nodes associated with the client of the data management system is established by performing a transport layer security handshake procedure between the second cluster of storage nodes in the data management system and the one or more host nodes associated with the client of the data management system.

8. The method of claim 1, wherein the certificate chain obtained by the second cluster of storage nodes in the data management system comprises a list of certificates that include a public key certificate associated with the second cluster and the root certificate associated with the certificate authority.

9. The method of claim 1, wherein the certificate authority is trusted by the one or more host nodes associated with the client of the data management system.

10. An apparatus for establishing secure connectivity at a data management system, comprising:

at least one processor;

memory coupled with the at least one processor; and instructions stored in the memory and executable by the at least one processor to cause the apparatus to:

transmit, to one or more host nodes associated with a client of the data management system, an indication of a backup service configuration that includes a public key certificate associated with a first cluster of storage nodes in the data management system and a root certificate associated with a certificate authority;

establish a primary connection between the first cluster and the one or more host nodes using a first key pair derived from the public key certificate in the backup service configuration, wherein the one or more host nodes are external to the first cluster;

receive, from the client of the data management system, an indication to transmit a certificate signing request to the certificate authority;

transmit the certificate signing request from a second cluster of storage nodes in the data management system to the certificate authority based at least in part on receiving the indication;

obtain, by the second cluster of storage nodes in the data management system, a certificate chain signed by the certificate authority based at least in part on transmitting the certificate signing request; and establish a secondary connection between the second cluster and the one or more host nodes in response to the first cluster becoming disconnected from the one or more host nodes based at least in part on a failure of the primary connection, wherein the secondary connection is established using a second key pair derived from the certificate chain signed by the certificate authority.

11. A non-transitory computer-readable medium storing code, the code comprising instructions executable by one or more processors to:

transmit, to one or more host nodes associated with a client of a data management system, an indication of a backup service configuration that includes a public key certificate associated with a first cluster of storage nodes in the data management system and a root certificate associated with a certificate authority;

establish a primary connection between the first cluster and the one or more host nodes using a first key pair derived from the public key certificate in the backup service configuration, wherein the one or more host nodes are external to the first cluster;

receive, from the client of the data management system, an indication to transmit a certificate signing request to the certificate authority;

transmit the certificate signing request from a second cluster of storage nodes to the certificate authority based at least in part on receiving the indication;

obtain, by the second cluster of storage nodes in the data management system, a certificate chain signed by the certificate authority based at least in part on transmitting the certificate signing request; and establish a secondary connection between the second cluster and the one or more host nodes in response to the first cluster becoming disconnected from the one or more host nodes based at least in part on a failure of the primary connection, wherein the secondary connection is established using a second key pair derived from the certificate chain signed by the certificate authority.

12. The non-transitory computer-readable medium of claim 11, wherein to establish the secondary connection, the instructions are further executable by the one or more processors too:

establish the secondary connection between the second cluster of storage nodes in the data management system and the one or more host nodes associated with the client of the data management system in accordance with a failover recovery scheme of the data management system.

13. The non-transitory computer-readable medium of claim 11, wherein the instructions are further executable by the one or more processors to:

designate the second cluster of storage nodes in the data management system as a primary cluster for the one or more host nodes associated with the client of the data management system after establishing the secondary connection between the second cluster of storage nodes in the data management system and the one or more host nodes associated with the client of the data management system.

14. The non-transitory computer-readable medium of claim 11, wherein to establish the secondary connection, the instructions are further executable by the one or more processors to:

establish the secondary connection between the second cluster of storage nodes in the data management system and the one or more host nodes associated with the client of the data management system in response to one or more of a service outage, a natural disaster, or an operational failure associated with the first cluster of storage nodes in the data management system.

15. The non-transitory computer-readable medium of claim 11, wherein the instructions are further executable by the one or more processors too:

generate a symmetric key to use for subsequent communications between the second cluster of storage nodes in the data management system and the one or more host nodes associated with the client of the data management system after establishing the secondary connection between the second cluster and the one or more host nodes.

16. The non-transitory computer-readable medium of claim 15, wherein the instructions are further executable by the one or more processors to:

exchange at least one message between the second cluster of storage nodes in the data management system and the one or more host nodes associated with the client of the data management system after the secondary connection is established, wherein the at least one message is encrypted using the symmetric key.

17. The non-transitory computer-readable medium of claim 11, wherein the secondary connection between the second cluster of storage nodes in the data management system and the one or more host nodes associated with the client of the data management system is established by performing a transport layer security handshake procedure between the second cluster of storage nodes in the data management system and the one or more host nodes associated with the client of the data management system.

18. The non-transitory computer-readable medium of claim 11, wherein the certificate chain obtained by the second cluster of storage nodes in the data management system comprises a list of certificates that include a public key certificate associated with the second cluster and the root certificate associated with the certificate authority.

* * * * *